(12) United States Patent
Sanders

(10) Patent No.: US 11,498,124 B1
(45) Date of Patent: Nov. 15, 2022

(54) METHOD FOR SINTERING POROUS STRUCTURES FROM POWDER USING ADDITIVE MANUFACTURING

(71) Applicant: ORTHO DEVELOPMENT CORPORATION, Draper, UT (US)

(72) Inventor: Anthony P Sanders, Sandy, UT (US)

( * ) Notice: Subject to any disclaimer, the term of this patent is extended or adjusted under 35 U.S.C. 154(b) by 265 days.

(21) Appl. No.: 16/694,646

(22) Filed: Nov. 25, 2019

(51) Int. Cl.
| | | |
|---|---|---|
| *B22F 3/11* | (2006.01) | |
| *B33Y 50/00* | (2015.01) | |
| *B33Y 10/00* | (2015.01) | |
| *B22F 10/00* | (2021.01) | |
| *G05B 19/00* | (2006.01) | |
| *B22F 10/10* | (2021.01) | |

(52) U.S. Cl.
CPC ............ *B22F 3/1115* (2013.01); *B22F 10/00* (2021.01); *B33Y 10/00* (2014.12); *B33Y 50/00* (2014.12); *G05B 19/00* (2013.01); *B22F 10/10* (2021.01); *G05B 2219/00* (2013.01)

(58) Field of Classification Search
CPC ........ B22F 3/1115; B22F 10/00; B22F 10/10; B33Y 10/00; B33Y 50/00; G05B 19/00; G05B 2219/00
See application file for complete search history.

(56) References Cited

U.S. PATENT DOCUMENTS

| | | |
|---|---|---|
| 3,906,550 A | 9/1975 | Rostoker |
| 4,224,696 A | 9/1980 | Murray |
| 4,550,448 A | 11/1985 | Kenna |
| 4,728,335 A | 3/1988 | Jurgutis |
| 4,735,625 A | 4/1988 | Davidson |
| 4,753,657 A | 6/1988 | Lee |
| 4,790,852 A | 12/1988 | Noiles |
| 4,834,756 A | 5/1989 | Kenna |
| 4,840,632 A | 6/1989 | Kampner |
| 4,865,607 A | 9/1989 | Witzel |
| 4,944,757 A | 7/1990 | Martinez |
| 4,944,760 A | 7/1990 | Kenna |
| 5,019,103 A | 5/1991 | Van Zile |
| 5,035,713 A | 7/1991 | Friis |

(Continued)

FOREIGN PATENT DOCUMENTS

| | | | | |
|---|---|---|---|---|
| CN | 102548509 A | * | 7/2012 | ............... A61F 2/28 |
| CN | 104732028 B | * | 5/2018 | |
| WO | WO 2011/060312 A3 | | 5/2011 | |

OTHER PUBLICATIONS

Biomet, Vanguard 360 Revision Knee System Design Rationale, USA, 2012.

(Continued)

*Primary Examiner* — Chad G Erdman
(74) *Attorney, Agent, or Firm* — Pate Peterson PLLC; Brett Peterson

(57) ABSTRACT

A novel process for creating porous structures via powder bed fusion additive manufacturing is provided. The process reduces the computational requirement for generation of the porous structure geometry and for processing the porous structure geometry to generate CNC code. The process provides reduced file size for CNC code and avoids large files which may exceed capacity of manufacturing machines. The process also significantly reduces the time required to sinter the porous structure on a powder bed fusion manufacturing machine.

30 Claims, 14 Drawing Sheets

(56) References Cited

U.S. PATENT DOCUMENTS

| | | |
|---|---|---|
| 5,037,423 A | 8/1991 | Kenna |
| 5,057,101 A | 10/1991 | Dorr |
| 5,192,324 A | 3/1993 | Kenna |
| 5,441,537 A | 8/1995 | Kenna |
| 5,462,563 A | 10/1995 | Shearer |
| 5,591,233 A | 1/1997 | Kelman |
| 5,697,932 A | 12/1997 | Smith |
| 5,734,959 A | 3/1998 | Krebs |
| 5,824,103 A | 10/1998 | Williams |
| 5,879,398 A | 3/1999 | Swarts |
| 5,958,314 A | 9/1999 | Draenert |
| 5,997,581 A | 12/1999 | Khalili |
| 6,008,432 A | 12/1999 | Taylor |
| 6,071,311 A | 6/2000 | O'Neil |
| 6,117,175 A | 9/2000 | Bosredon |
| 6,136,029 A | 10/2000 | Johnson |
| 6,139,584 A | 10/2000 | Ochoa |
| 6,156,070 A | 12/2000 | Incavo |
| 6,214,053 B1 | 4/2001 | Ling |
| 6,264,699 B1 | 7/2001 | Noiles |
| 6,432,141 B1 | 8/2002 | Stocks |
| 6,464,728 B1 | 10/2002 | Murray |
| 6,692,531 B1 | 2/2004 | Yoon |
| 6,767,369 B2 | 7/2004 | Boyer |
| 6,843,806 B2 | 1/2005 | Hayes |
| 6,863,692 B2 | 3/2005 | Meulink |
| 6,974,483 B2 | 12/2005 | Murray |
| 6,981,991 B2 | 1/2006 | Ferree |
| 7,044,977 B2 | 5/2006 | Ferree |
| 7,115,146 B2 | 10/2006 | Boyer |
| 7,182,786 B2 | 2/2007 | Justin |
| D538,431 S | 3/2007 | Botha |
| 7,291,174 B2 | 11/2007 | German |
| 7,323,013 B2 | 1/2008 | McTighe |
| 7,491,242 B2 | 2/2009 | Pichon |
| 7,575,603 B2 | 8/2009 | Bergin |
| D618,800 S | 6/2010 | Mayon |
| 7,799,085 B2 | 9/2010 | Goodfried |
| 7,799,086 B2 | 9/2010 | Justin |
| 7,806,936 B2 | 10/2010 | Wright |
| 7,857,858 B2 | 12/2010 | Justin |
| 7,892,288 B2 | 2/2011 | Blaylock |
| 7,892,290 B2 | 2/2011 | Bergin |
| 8,075,628 B2 | 12/2011 | Justin |
| 8,187,336 B2 | 5/2012 | Jamali |
| 8,241,357 B2 | 8/2012 | Bhatnagar |
| 8,241,367 B2 | 8/2012 | Justin |
| 8,268,007 B2 | 9/2012 | Barsoum |
| 8,382,849 B2 | 3/2013 | Thomas |
| 8,424,183 B2 | 4/2013 | Thomas |
| 8,444,699 B2 | 5/2013 | Metzger |
| D684,693 S | 6/2013 | Hanssen |
| 8,506,645 B2 | 8/2013 | Blaylock |
| 8,535,385 B2 | 9/2013 | Hanssen |
| 8,535,386 B2 | 9/2013 | Servido |
| 8,585,770 B2 | 11/2013 | Meridew |
| 8,641,773 B2 | 2/2014 | Bergin |
| 8,679,166 B2 | 3/2014 | Bhatnagar |
| 8,721,733 B2 | 5/2014 | Bonitati |
| 8,728,168 B2 | 5/2014 | Hanssen |
| 8,876,909 B2 | 11/2014 | Meridew |
| 8,900,317 B2 | 12/2014 | Zubok |
| 8,926,708 B2 | 1/2015 | Servido |
| 8,932,364 B2 | 1/2015 | Mooradian |
| 8,968,415 B2 | 3/2015 | Meridew |
| 9,044,326 B2 | 6/2015 | Blaylock |
| 9,161,840 B2 | 10/2015 | Hayes |
| 9,241,801 B1 | 1/2016 | Parry |
| 9,265,614 B2 | 2/2016 | Blaylock |
| 9,289,299 B2 | 3/2016 | Metzger |
| 9,517,138 B2 | 12/2016 | Zubok |
| 9,539,096 B2 | 1/2017 | Hanssen |
| 9,668,870 B2 | 6/2017 | Wasielewski |
| 9,713,532 B2 | 7/2017 | Blaylock |
| 9,744,047 B2 | 8/2017 | Meridew |
| 9,907,664 B2 | 3/2018 | Blaylock |
| D847,338 S | 4/2019 | Arabin |
| D875,936 S | 2/2020 | Martin |
| 2001/0004712 A1 | 6/2001 | Sydney |
| 2001/0039456 A1 | 11/2001 | Boyer |
| 2002/0045949 A1 | 4/2002 | Ling |
| 2003/0065397 A1 | 4/2003 | Hanssen |
| 2003/0130740 A1 | 7/2003 | Stocks |
| 2003/0153981 A1 | 8/2003 | Wang |
| 2004/0049285 A1 | 3/2004 | Haas |
| 2004/0162619 A1 | 8/2004 | Blaylock |
| 2005/0010304 A1 | 1/2005 | Jamali |
| 2005/0283254 A1 | 12/2005 | Hayes |
| 2006/0147332 A1 | 7/2006 | Jones |
| 2006/0229734 A1 | 10/2006 | Yoon |
| 2007/0088443 A1 | 4/2007 | Hanssen |
| 2008/0195218 A1 | 8/2008 | Jones |
| 2010/0114323 A1 | 5/2010 | Deruntz |
| 2010/0145452 A1 | 6/2010 | Blaylock |
| 2010/0222891 A1 | 9/2010 | Goodfried |
| 2012/0059484 A1 | 3/2012 | Justin |
| 2012/0215311 A1 | 8/2012 | Parry |
| 2012/0321878 A1 | 12/2012 | Landon |
| 2013/0013078 A1 | 1/2013 | Hanssen |
| 2013/0013080 A1 | 1/2013 | Hanssen |
| 2013/0018478 A1 | 1/2013 | Hanssen |
| 2014/0081418 A1 | 3/2014 | Hanssen |
| 2014/0249637 A1 | 9/2014 | Hanssen |
| 2014/0277534 A1 | 9/2014 | Wasielewski |
| 2015/0257890 A1 | 9/2015 | Blaylock |
| 2016/0058560 A1 | 3/2016 | Blaylock |
| 2016/0193049 A1 | 7/2016 | McTigue |
| 2017/0020675 A1 | 1/2017 | Blaylock |
| 2017/0333195 A1 | 11/2017 | Wasielewski |
| 2018/0098856 A1 | 4/2018 | Blaylock |
| 2020/0230888 A1* | 7/2020 | Kim ............... B29C 64/106 |

OTHER PUBLICATIONS

Depuy, Knee Revision Product Portfolio, USA, 2009.
Depuy, Gription TF Acetabular Augments, USA, 2013.
Depuy, Sigma LCS Revision Brochure, USA, 2006.
Gross, Allografts in Orthopaedic Practice, p. 184, Williams & Wilkins, Baltimore USA, 1992.
Mnaymneh, Massive Allografts in Salvage Revisions of Failed Total Knee Arthroplasties, Clinical Orthopedics, Nov. 1990, pp. 144-153, No. 260.
Zimmer, Trabecular Metal Femoral and Tibial Cone Augments, USA, 2008.

\* cited by examiner

METHOD FOR SINTERING POROUS STRUCTURES FROM POWDER USING ADDITIVE MANUFACTURING

THE FIELD OF THE INVENTION

The present invention relates to manufacturing porous structures. In particular, examples of the present invention relate to a method for manufacturing porous structures which reduces the time required to manufacture porous structures and increases the quality of the porous structures.

BACKGROUND

Applicants have developed a method of manufacturing a large scale porous structure through additive manufacturing. Powder bed fusion techniques such as laser sintering metal powder are often used. The manufacturing process results in a consistent product while significantly reducing the time necessary to manufacture the product. Manufactured porous structures are useful in medical implants and can also be useful in light weight structures, filtration, fluid flow or mixing, etc.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
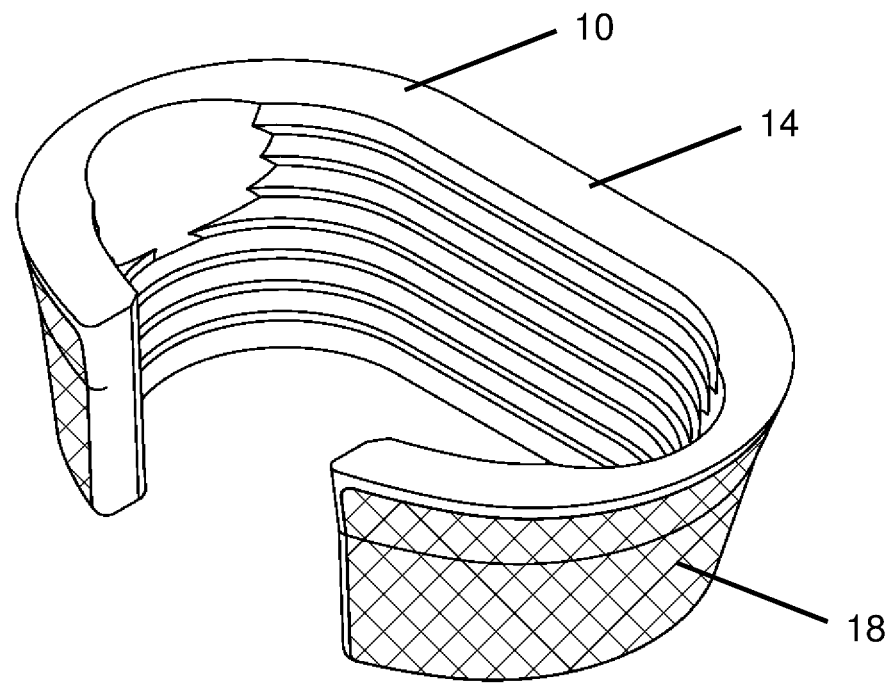
FIG. 1 is a drawing which shows an example medical implant with a solid portion and a porous portion.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show every element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "computer," "module" or "system." Furthermore, the present invention may take the form of a computer program product embodied in any tangible medium of expression having computer-usable program code embodied in the medium.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Embodiments may also be implemented in cloud computing environments. In this context, "cloud computing" may be defined as a system for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud computing system can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be such as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a number or numerical range endpoint by providing that a given value may be "a little above" or "a little below" the number or endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

Figure 2:
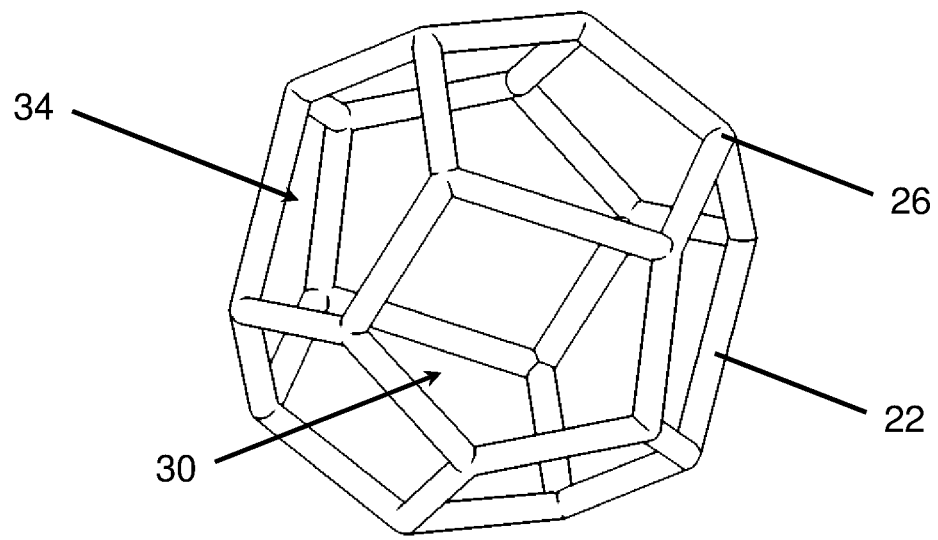
FIG. 2 is a drawing which shows a perspective view of a single polyhedral cell in a theoretical porous structure.

FIG. 1 illustrates a device; an example medical implant 10 manufactured according to the present invention. The example medical implant 10 has an overall shape which is particularly useful in replacing lost bone stock near the end of a long bone, such as at a knee joint. The example medical implant 10 has a mechanically composite structure which has both a solid portion 14 and a porous portion 18 (represented by cross-hatching) which are integrally connected to form the overall implant 10. The solid portion 14 provides strength to the implant 10 and allows the implant 10 to support a prosthetic joint, such as a prosthetic knee joint component. The porous portion 18 provides increased elasticity and allows the implant 10 to interface with cancellous and cortical bone in a manner which allows bone ingrowth and minimizes stress at the bone/implant interface by minimizing strength and elasticity differences between the implant 10 and the bone. In the example medical implant 10, the solid portion 14 occupies approximately one fifth of the thickness of the implant wall and the porous structure 18 occupies approximately four fifths of the thickness of the implant wall. Other medical implants may be used to anchor different prosthetic joints, repair bone, etc. The porous portion 18 is a porous structure on a large scale; meaning that while it is typically made from a generally solid material such as sintered titanium metal, it includes large scale porosity such as open cells which are formed between struts of material. FIG. 2 shows a single example polyhedral cell within a porous structure. The porous structure is generally formed by a network of struts 22 which are connected together at nodes 26. Different structures for the struts 22 may be chosen. In the example shown, the struts are joined together to form polyhedral cells 30 between a group of struts 22. The cell 30 is a volume of space between surrounding struts. The cells 30 are open in that they are not isolated from adjacent cells with material. As shown in FIG. 2, openings 34 are formed between struts 22 around the perimeter of the cell 30 and these openings 34 connect the empty space in adjacent cells so that material can move between adjacent cell spaces. The solid portion 14 of the implant 10 is generally solid and may be manufactured at the same time as the porous portion 18 so that the solid portion 14 and porous portion 18 are integrally formed with each other. This promotes reliability and eliminates additional assembly processes to bond a solid portion to a porous portion of a part.

The porous structured material described herein may also be used for other industrial purposes. The porous structure may be used as a lightweight core material within a larger mechanical construct such as a lightweight core supporting an outer skin. The porous structure material may also be used for fluid processes such as mixing, flow diffusion, or filtration.

As discussed herein, "solid portion," "solid structure," or "solid" refers to a structure which is a generally continuous volume of material. It is understood that the material forming the solid portion may contain porosity, surface roughness, etc. while the material forming the solid portion occupies a generally continuous volume. Additionally, the solid structure may contain flanges, slots, holes, bends, or other design features which form part of the solid portion of the device, but the solid portion is otherwise made of a generally continuous volume of material. In contrast, "porous structure" as used herein refers to an overall structure which is porous due to a physical design even though it is often manufactured from a solid material. The porous structure typically includes struts and nodes connected in a reticulated network that forms cells and openings (windows) between adjacent cells. A "cell" of a porous structure refers to a small subdivision of the structure that includes a set of struts connected at nodes in truss-like fashion such that they surround a volume of space. The struts for a cell often form a roughly polyhedral geometry, although the polyhedra may be irregularly shaped. The term "cell" may refer to the space between struts, or the space in addition to the struts defining the space depending on the context. An "opening" or "window" refers to an open facet of such a cell, which provides a passageway between the interior of one cell and the interior of an adjacent cell. A "window" may also be referred to as a "pore". The porous structure (e.g. the struts and nodes which make up the porous portion) is typically formed in a powder bed fusion process from a powdered material such as titanium metal which is selectively fused together into a mechanical structure with struts, cells, openings, pores, etc. The porous structure is often formed as an open celled structure which includes a network of struts and nodes (joints between struts) with open cells as well as open windows between adjacent cells defined by the struts and nodes. The struts and nodes are typically formed as substantially solid themselves, but the overall porous structure incorporates a large amount of void space in its cells and pores. The term "porous portion" is typically used herein to designate the overall volume of struts and nodes forming the porous structure within a larger part 10 or device such as the designation of the porous volume 18 in FIG. 1. The terms "porous structure" or "porous structure geometry" are typically used to refer to the particular geometric structure of struts and nodes used to create the porous structure which fills the overall porous portion 18 of the part 10.

Figure 3:
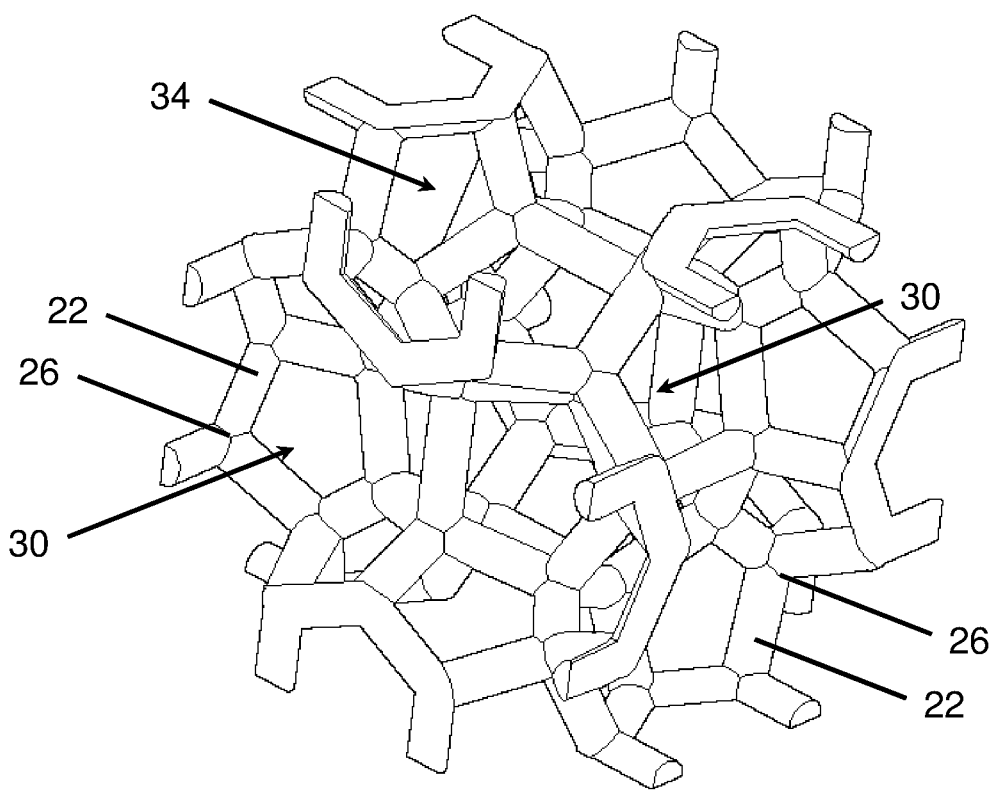
FIG. 3 is a drawing which shows a perspective view of a theoretical porous structure.

FIG. 3 shows a drawing of the theoretical model of the porous structure as may be used in the porous portion 18 of the medical implant 10 of FIG. 1 or in other industrial applications. FIG. 3 shows a similar porous structure as is shown in FIG. 2 but the porous structure has been expanded beyond a single cell 30 to include parts of adjacent cells 30. The figure shows how the porous structure might be constructed in a computer model of the porous structure. This theoretical structure of the porous structure differs from the manufactured porous structure because of irregularities caused by a layer-wise additive manufacturing process and by the random arrangement of powder particles in the powder bed fusion process, as described herein. The porous structure includes a plurality of struts 22 which are joined together at nodes 26. The porous structure includes open cells 30 which include open cell volumes surrounded by the adjacent struts 22. The porous structure is open celled in that cells 30 are open to adjacent cells 30 with openings 34 formed between the struts 22 that surround the cells 30. The struts 22 each have a diameter and extend along a line between nodes 26 such that the nodes 26 are connected by the struts 22. As shown, the theoretical struts 22 are straight; extending in a straight line between the node points 26, although other strut shapes could be used if desired. Additionally, the porous structure could incorporate some struts of larger diameter/size and some struts of smaller diameter/size. This may be used to provide a smaller porous strut network within a supporting scaffold of larger struts within a porous portion 18 of a part, for example.

For medical applications using the porous portion 18 to provide a bone interface, the cells 30 are typically between about 0.7 mm and about 2 mm in size and are often about 0.7 mm in size. The struts are often about 0.2 mm in diameter. The struts may often be between about 0.1 mm and about 0.8 mm in diameter according to the desired mechanical properties of the porous portion 18. Windows between adjacent cells may often be between about 0.2 and about 0.8 mm in size, and are often about 0.3 mm in size for porous portions 18 which form a bone interface in a device. These dimensions result in a porous structure which is approximately 20 percent solid struts and about 80 percent open space. The porous structure may often be between about 10 percent material and about 30 percent material with a complementary volume of open space which is between about 90 percent and about 70 percent open space. The dimensions of the porous portion 18 may be varied to vary the properties of the resulting porous portion 18. The size (diameter) and length of the struts 22 as well as the overall strut/node geometry may be varied to vary the pore size and nature of the porous portion 18. For example, a porous structure used as a lightweight core in a part might include longer struts and result in a lighter structure. In one example, the struts are aligned along edges of polyhedral geometric shapes such as dodecahedron or tetradecahedron shapes which may be irregular in shape. Other shapes such as crystal lattices and tiling polyhedra may be used to create the struts 22 and nodes 26.

Figure 4:
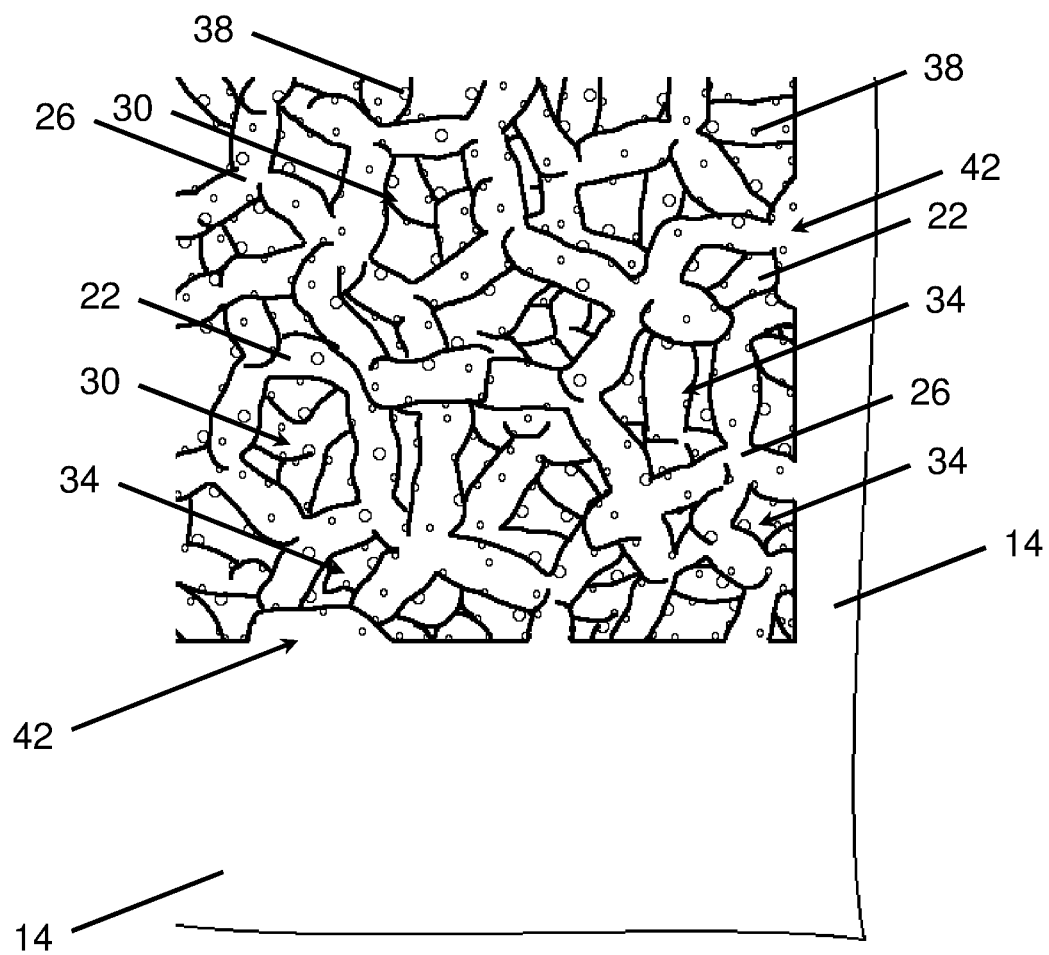
FIG. 4 is a drawing which shows an example manufactured porous structure.

FIG. 4 shows a drawing of the manufactured porous portion 18 corresponding to the theoretical drawing of FIG. 3. The example porous portion 18 is formed by powder bed additive manufacturing where the desired part is manufactured layer by layer in a machine using an energy beam to melt and fuse selective portions of a layer of powder. The machine adds and compacts a layer of powder on top of an already fused layer of powder and then fuses the current layer according to the areas of the powder in the current layer which form part of the resulting structure being manufactured. For example, by laser sintering titanium powder in discrete Z height layers in an additive manufacturing laser sintering machine. The manufacturing process introduces some irregularity in the struts even if the struts 22 were theoretically straight and uniform in a theoretical model of the struts 22. The example porous portion 18 includes a large number of struts 22 which intersect at and are fused together at nodes 26. Generally, the struts 22 are aligned along edges of polyhedral geometric shapes with the nodes 26 positioned at the vertices of the polyhedral shape. The structure of the struts 22 forms a number of open cells 30 with windows 34 between adjacent cells 30. In one example, the cells 30 may approximate 12 or 14 sided polyhedral shapes and any given cell 30 may have 6 or more windows 34 to adjacent cells 30.

Struts 22 which may be uniform in a theoretical model become irregular in shape and diameter when laser sintered from titanium powder. The layer by layer sintering of a strut 22 which extends through several sintering layers results in a strut 22 which has several thicker or bulbous sections connected by somewhat thinner sections due to the manner in which the sintering machine melts titanium powder in discrete layers. This irregularity in size and shape of the struts 22 can be seen in FIG. 4. It can also be seen how the struts 22 become covered by small nodules 38 of titanium. Most of the struts 22 are covered with varying sizes of bumps or nodules 38 of titanium. When the porous material 18 is laser sintered, a layer of titanium powder is melted by the laser to form the strut 22. Particles of titanium powder which are largely within the strut volume but which are partially outside of the strut volume may melt into the strut and form a bulge or protuberance on the strut 22. Particles of titanium powder adjacent the volume of the sintered strut 22 may stick to the strut when the strut 22 is sintered.

This results in the rough and irregular surface shown in FIG. 4. The surface of the porous portion 18, including both struts 22 and nodes 26 in the porous portion 18 and surfaces of the solid portion 14 have varying sizes of titanium nodules 38 randomly distributed across the surface. The titanium nodules 38 are often similar in size to the titanium powder used to form the porous implant. The surface nodules 38 provide an amount of surface roughness which is beneficial for bone ingrowth and cement adhesion and may be desirable for other industrial uses of the porous structure. Manufacture of the porous portion 18 by laser sintering of titanium powder thus provides a unique surface which is naturally irregular and rough and suitable for bone and cement adhesion as well as for other applications such as fluid mixing or filtration.

FIG. 4 also shows the solid portion 14 and illustrates how a device such as the medical implant 10 may be manufactured as a single unitary structure including both the contiguously built solid portion 14 and the porous portion 18. FIG. 4 shows a portion of the solid portion 14, such as a wall or other structure in the final part. As discussed, the solid portion 14 is formed by a generally continuous volume of material while the porous portion 18 is formed by a network of struts 22 of material with spaces between the struts 22. By manufacturing the medical implant 10 in an additive manufacturing process such as direct metal laser sintering, the solid portion 14 is integrally formed with the porous portion 18 and these are joined together where struts 22 intersect the solid portion 14 as indicated at locations 42. This reduces manufacturing costs by eliminating additional bonding steps to assemble and connect the porous portion to the solid portion and increases the strength and reliability of the resulting device. Other materials can be used to manufacture a porous device through additive manufacturing as discussed herein. Metal powders such as steel or stainless steel or ceramic powder could also be laser sintered as discussed herein to manufacture a desired device with porous portion 18.

Figure 5:
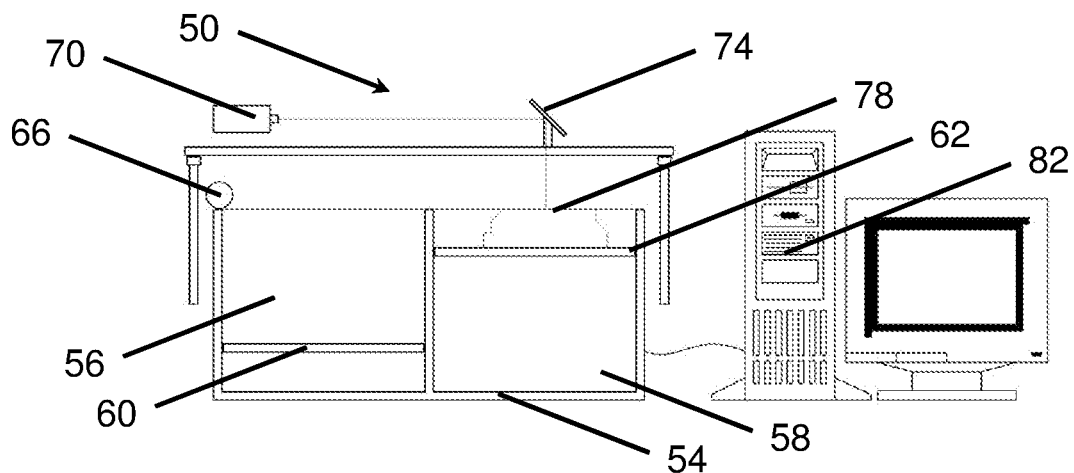
FIG. 5 is a schematic drawing which shows a powder bed fusion manufacturing machine and associated computer.

FIG. 5 shows a schematic drawing of a system for manufacturing parts/devices with porous structures. An additive manufacturing machine 50 such as a selective laser sintering machine may include an enclosure 54 that houses a powder bed area 58. A build plate 62 is movable in the powder bed area 54. The enclosure 54 frequently houses a powder supply area 56 adjacent the manufacturing powder bed area 58. A roller 66 levels and compacts the powder for sintering. The build plate 62 begins at a position near the top of the powder bed 58 and a layer of powder is rolled into the powder bed 58 from the powder supply area 56 and leveled by the roller 66. An energy source such as a laser 70 is coupled with a gantry mounted focusing head and mirrors, scanning mirror, or other aiming/focusing device 74. The powder bed additive manufacturing machine 50 typically includes an onboard computer processor, memory, and user interface to allow it to store and process CNC code which drives the operation of the machine 50 to create a desired part 78. The onboard computer hardware in the additive manufacturing machine 50 will often provide primary computational power to control the operation of the machine 50 according to received CNC code to produce the desired part 78.

The energy source (e.g. laser 70) and aiming/focusing device 74 are computer controlled to selectively fire the energy source 70 at determined X,Y coordinates on the powder bed surface to melt powder particles together and to fuse them to lower (previously formed) layers to form a desired part 78. The machine 50 will typically sinter a new layer of the part by lowering the build plate 62 a distance equal to a sintering layer thickness while raising a similar plate 60 in a powder reservoir to dispense powder from the powder reservoir, use a roller/spreader 66 to move powder from the powder reservoir to the powder bed 58 and smooth the powder, and selectively aim and fire the energy beam to melt powder into the current layer of the part and to fuse the current part layer with the previously sintered layer. The machine 50 repeats this process for each layer until the part has been manufactured.

CNC code is control programming instructions used to control the manufacturing machine 50. For example, machines for direct metal laser sintering may use SLI CNC files which include layer sliced part sintering path CNC code to control operation of the manufacturing machine. The manufacturing machine may receive a SLI file which includes layer designated sintering path information and then internally process the SLI CNC code to prepare for operation of the manufacturing machine 50. In this manner, different makes of manufacturing machines 50 may receive CNC code and perform varying degrees of additional processing to prepare for manufacturing the desired device. A manufacturing machine 50 may receive SLI CNC code with layer designated sintering path information and process the CNC code to insert particular machine commands for starting and stopping the energy beam at the start and end of sintering paths, for lowering the build plate and distributing powder between layers, etc. The formatting of CNC code varies according to different types and manufacturers of manufacturing machines 50, and typically uses specific codes to cause operation of a particular aspect of the manufacturing machine. For example, particular codes are often used to set laser power, to set movement speed while sintering, to turn a sintering laser 70 on or off, to aim the laser beam focus point at a certain point on the powder bed 58, or to move the laser beam focus point to another certain point on the powder bed 58. The CNC code may thus cause the additive manufacturing machine 50 to aim the laser at a certain point, and then fire the laser while moving at a desired speed to another point to sinter powdered material in the powder bed 58. In this manner, the CNC code includes individual location to location operational instructions to operate the manufacturing machine 50 to produce the desired part 78. An interested party may research G-code, for example, as a way that CNC machines are operated by CNC code to manufacture a desired object.

A secondary computer 82 including a processor, memory, and user interface (typically a monitor, mouse, and keyboard) may be connected to the manufacturing machine 50. The secondary computer 82 may be used for designing the desired part 10 including the geometry of any solid portion 14 and porous portion 18, and may also be used to provide memory storage and operational computational power to the manufacturing machine 50 in some cases. In one example use, the secondary computer 82 is used to design the desired part 10 (such as a CAD model of any solid portion 14 and a computer model of the porous portion 18), create CNC code for operation of the manufacturing machine 50 from the computer model of the desired part, and send the CNC code to the manufacturing machine 50. The primary computer hardware of the manufacturing machine 50 may then perform final processing of the CNC code and operate the machine 50 to create the part 10 according to the movement instructions in the CNC code. In another example use, the computer 82 may be used to design a desired part 10, perform some steps in creating CNC code for the part (such as slicing the solid portion of the part, creating node point pairs for struts, and creating sintering layer specific CNC movement instructions for struts, and sending the code to the manufacturing machine 50 for final processing and execution to manufacture the part 10.

The term computer is used to refer to the computing components which may be part of a computing device such as a desktop computer, portable computer, or manufacturing machine. The computer typically includes memory (such as drive storage and RAM memory), input/output components, and processing components to allow it to receive, process, and execute instructions or to receive, process, and output information to allow the manufacturing machine 50 to create a desired industrial component 10. A computer may include various components including dedicated memory and processing components, screens, keyboard, mouse, dedicated and programmable processing chips, etc. The manufacturing machine 50 also typically includes similar computer components.

Figure 6:
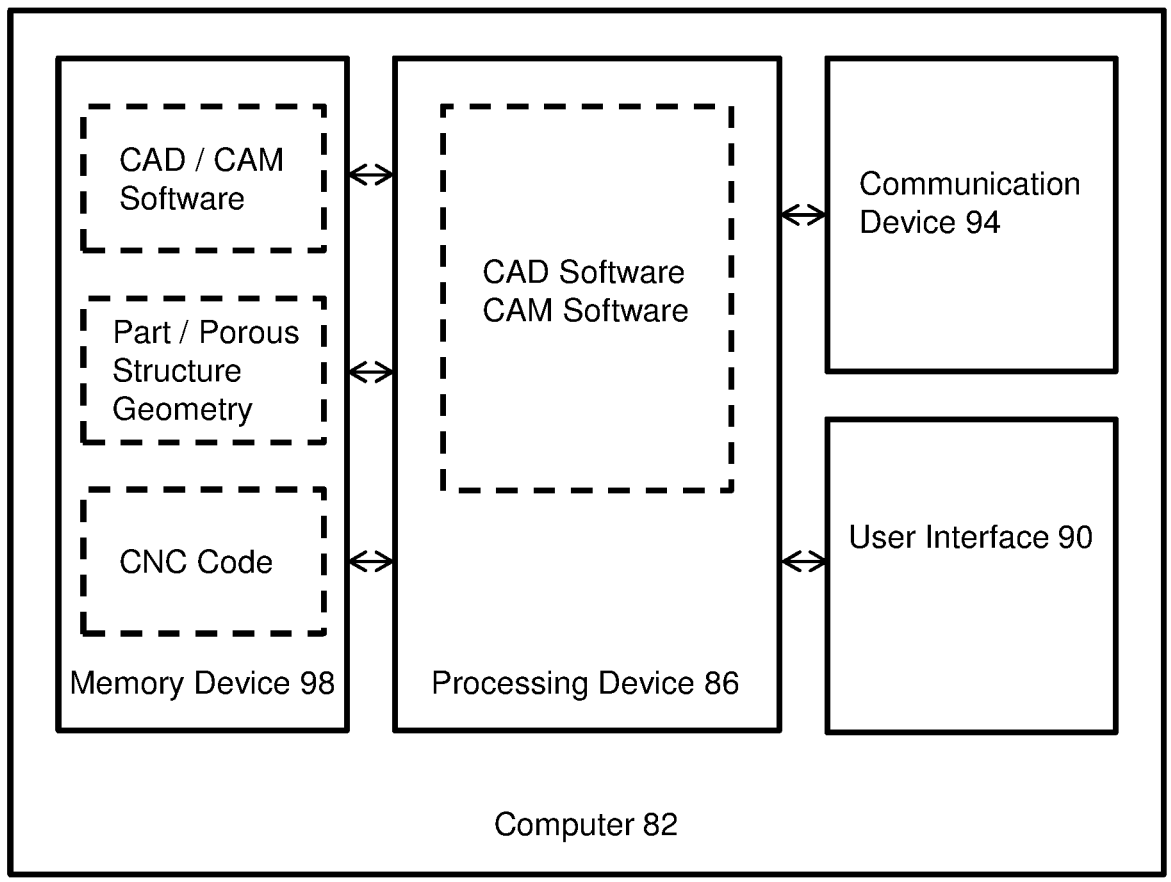
FIG. 6 is schematic drawing which shows example computer components.

FIG. 6 is a schematic drawing which illustrates example components of the computer 82. In one example, the computer 82 includes a processing device 86, a user interface 90, a communication device 94, and a memory device 98. It is noted that the computer 82 can include other components and some of the components are not required in every example. The processing device 86 can include memory, e.g., read only memory (ROM) and random access memory (RAM), storing processor-executable instructions and one or more processors that execute the processor-executable instructions. In embodiments where the processing device 86 includes two or more processors, the processors can operate in a parallel or distributed manner. The processing device 86 can execute the operating system of the computer 82. The processing device 86 may also execute firmware or software (such as CAD software and CAM software) which may be stored as programmed instructions in the memory device 98 to create or manipulate geometric information regarding the shape of the part 10 including solid portion 14 and porous portion 18, create CNC code from the geometry of the porous portion 18, and transmit CNC code or operational instructions to the additive manufacturing machine 50 via the communication device 94, for example.

The user interface 90 may typically include one or more devices such as a monitor, a touch screen, a keyboard, a mouse, a microphone, and/or a speaker. The communication device 94 is a device that allows the computer 82 to receive instructions from a user and to communicate with another device; such as the manufacturing machine 50. The communication device 94 can include one or more wireless transceivers for performing wireless communication and/or one or more communication ports for performing wired communication and may transmit information to the manufacturing machine such as by Ethernet, USB, or RS232/serial cables, for example.

The memory device 98 is a device that stores data generated or received by the computer 82 and may provide data to or receive data from the processing device 86. The memory device 98 can include, but is not limited to a solid state/hard disc drive, an optical disc drive, and/or a flash memory drive. The memory device 98 may store and transmit various components necessary to operate the manufacturing machine 50 such as operating system software, CAD/CAM software, part and porous structure geometry, CNC codes, etc. as are necessary to implement the various tasks and examples discussed herein.

Figure 7:
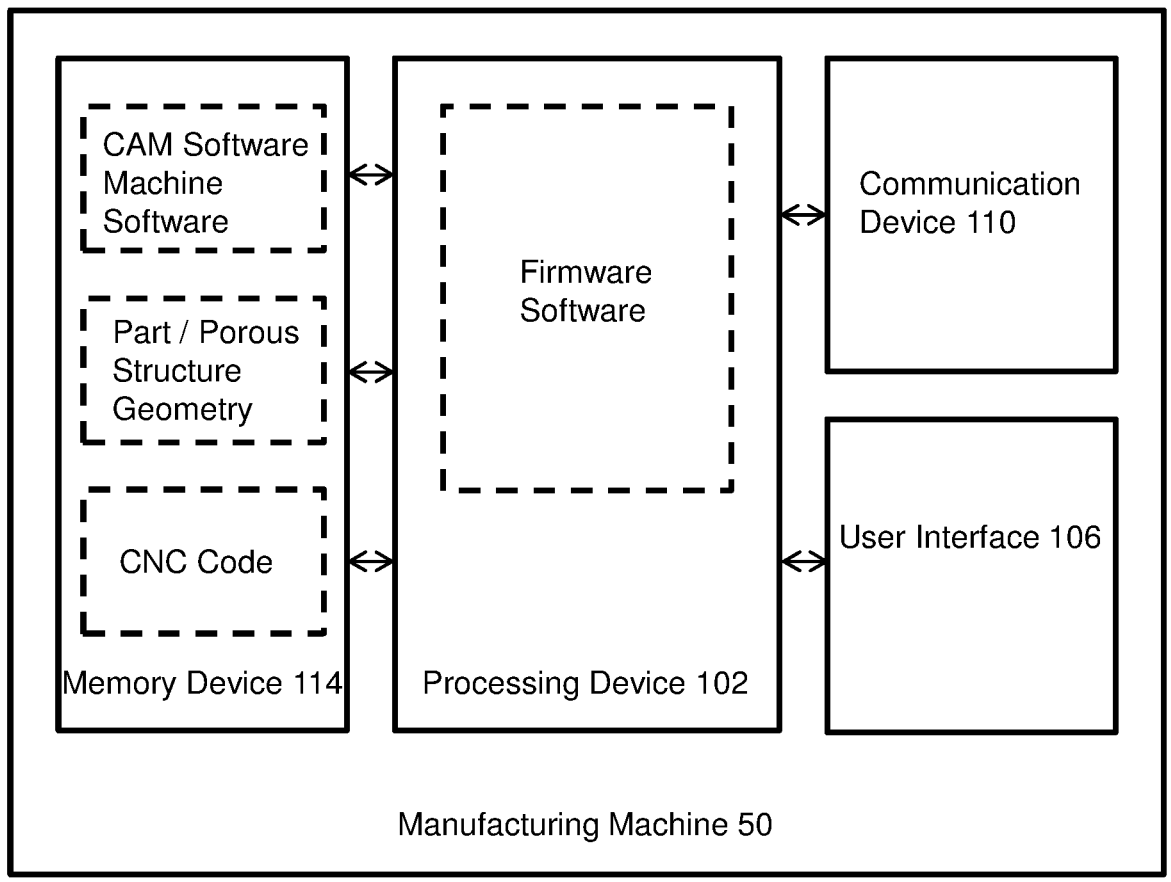
FIG. 7 is schematic drawing which shows example computer components within the manufacturing machine.

FIG. 7 is a schematic drawing which illustrates example computer components of the manufacturing machine 50. In one example, the manufacturing machine 50 includes a processing device 102, a user interface 106, a communication device 110, and a memory device 114. It is noted that the manufacturing machine 50 can include other components and some of the components are not required in every example. The processing device 102 can include memory, e.g., read only memory (ROM) and random access memory (RAM), storing processor-executable instructions and one or more processors that execute the processor-executable instructions. In embodiments where the processing device 102 includes two or more processors, the processors can operate in a parallel or distributed manner. The processing device 102 can execute CNC code and control operation of the manufacturing machine 50. The processing device 102 may also execute firmware or software which may be stored as programmed instructions in the memory device 114 to create or manipulate geometric information regarding the shape of the porous portion 18, create/finalize CNC code from the geometry of the porous portion, initialize or implement operational instructions for the additive manufacturing machine 50 to operate the manufacturing machine 50, etc.

The user interface 106 may typically include one or more devices such as a monitor, a touch screen, a keyboard, a mouse, or a keypad. The user interface 106 allows a user to interact with the manufacturing machine 50 to control operation of the manufacturing machine 50 and, in some cases, to program the manufacturing machine 50. The communication device 110 is a device that allows the manufacturing machine 50 to communicate with the computer 82 and also allows the processing device 102 to communicate with other devices in the manufacturing machine 50 such as motor controllers, energy beam devices (e.g. a laser or electron beam and associated power supply equipment), etc. to control operation of the manufacturing machine 50. The communication device 110 can include one or more wireless transceivers for performing wireless communication and/or one or more communication ports for performing wired communication and may transmit or receive information from the computer 82 such as by dedicated analog or digital inputs and outputs, Ethernet, USB, or serial ports and cables, for example. The communication device 110 may include various analog or digital outputs and inputs to monitor the status of various parts of the manufacturing machine 50 and to control operation of the various parts of the manufacturing machine 50 to facilitate manufacture of a desired part 10.

The memory device 114 is a device that stores data generated or received by the processing device 102 or the computer 82 and may provide data to or receive data from the processing device 102. The memory device 114 can include, but is not limited to a solid state/hard disc drive, an optical disc drive, and/or a flash memory drive. The memory device 114 may store and transmit various data components necessary to operate the manufacturing machine 50 such as machine firmware/software, part geometry, porous structure geometry, CNC code, etc. as are necessary to implement the various tasks and examples discussed herein.

Additive powder bed fusion manufacturing machines 50 may vary in which computing functions are handled by internal computer hardware versus external computer hardware. Some machines may include computer hardware such as motion control board which receives CNC code from an external computer in real time while controlling operation of the manufacturing machine 50. Some machines may primarily handle execution of finalized CNC code to control machine operation such as the powder bed, motion, and sintering control internally and may rely on external computer hardware for generation of CNC code and other processing capabilities. Some machines may have internal computer hardware to additionally handle CNC code generation, modification, and processing internally. It is understood that the various computational tasks discussed herein may be distributed between internal computer hardware in a manufacturing machine 50 or external computer hardware 82 according to the design of a particular manufacturing machine 50.

Figure 8:
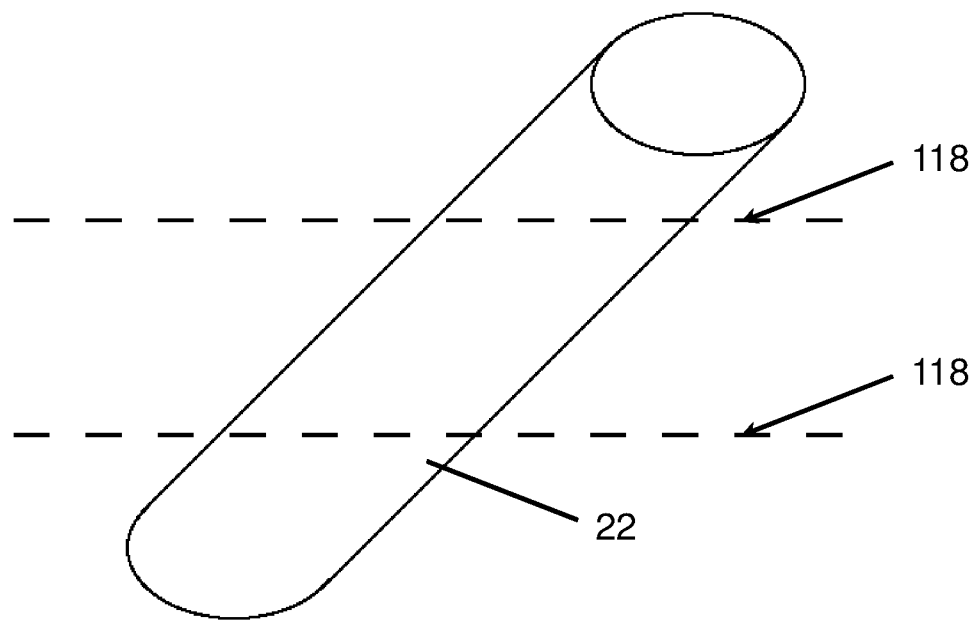
FIG. 8 is a drawing which illustrates slicing a geometric structure to create sintering paths.

FIG. 8 shows an example theoretical segment of a strut 22 as may be part of a porous structure. In manufacturing the strut 22 in a powder bed fusion process, the strut 22 is divided into sintering planes 118 and is sintered layer-by-layer by a manufacturing machine 50 as discussed in the following figures.

Figure 9:
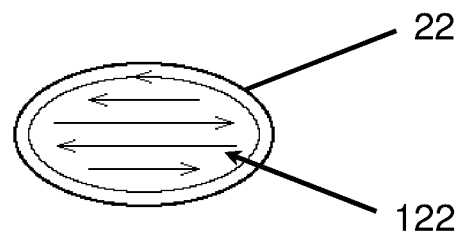
FIG. 9 is a drawing which shows example prior art sintering paths.

FIG. 9 illustrates how a layer of the strut 22 of FIG. 8 may be sintered according to prior art methods. FIG. 9 shows a top view of the cross-section of the strut 22 located at the upper sintering plane 118 shown in FIG. 8. In order to manufacture the strut 22, a computer aided drafting program (e.g. CAD software) is used to create a 3D model of the strut (as well as all other structures of the larger part being made) such as the example strut geometry shown in FIG. 8. The 3D model is typically exported from the CAD software in a geometry model (such as an STL file) which is typically a model describing only the geometry of the part 10 and not describing other part attributes; often using a triangulated surface to describe the part geometry. The geometry model is then processed by computer aided manufacturing software (e.g. CAM software) The CAM software will receive the geometry model of the part and will create the CNC code necessary for a manufacturing machine 50 to create the desired part. For layer-by-layer additive manufacturing, the CAM software will create the sintering planes 118 according to a defined manufacturing layer thickness and will "slice" the volume of the part 10 (e.g. the strut 22 in this example) according to the sintering planes 118 in order to create cross-sections of the part 10 at each sintering plane 118. Conceptually, slicing a part is separating the part into cross-sectional layers so that each layer may be sequentially manufactured using additive manufacturing. FIG. 9 is looking down onto the cross-section of the strut 22 at the upper sintering plane 118. The CAM software then creates a beam sintering path 122 (e.g. for a laser sintering beam) to fuse powder in the machine powder bed and create the section of the strut 22 pertaining to the sintering layer (between the upper sintering plane 118 and the lower sintering plane 118). The beam path 122 will typically trace the perimeter of the cross-section of the strut 22 at the sintering layer 118 and will then make multiple passes across the interior of the cross-section of the strut 22 to fuse the metal powder together across the entire cross-section of the strut 22 in the relevant sintering layer. For larger part cross-sectional areas, the sintering strategy may also include breaking the sintered area into smaller islands and creating sintering paths which scan across these islands in different directions, etc. In addition to the path shown, the manufacturing machine 50 must typically add in lead-in and lead-out vectors where the location of the laser beam focus spot is moved without actually sintering the material to allow the machine to accelerate into and decelerate out of the sintering path since the machine cannot instantaneously accelerate the focus spot movement mechanics 74 in corners or in starting and stopping a sintering path. The section of the strut 22 is manufactured in this manner in a manufacturing machine using the sintering beam to fuse the metal powder while tracing the perimeter of the cross-section of the strut 22 and also making multiple passes across the interior of the strut section to fuse the metal. This results in significant computer processing time to create the 3D model, geometric model, and CNC code as well as significant manufacturing time to create porous structures. Each cross-section of a strut 22 requires the computer 82 to slice a 3D geometric structure, identify the perimeter of the 3D structure cross-section, offset a boundary sintering path from the perimeter, and create the crosshatching path to sinter the interior of the structure cross-section. The sintering machine must then process the sintering path code and sinter this complex path.

Figure 10:
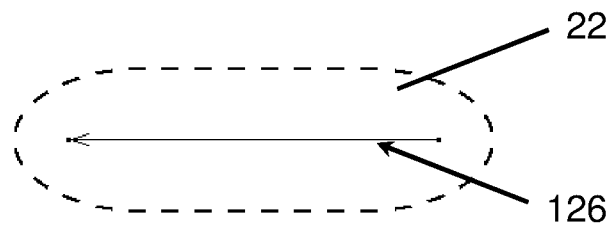
FIG. 10 is a drawing which shows an example sintering path of the present invention.

FIG. 10 shows the inventive process for sintering the same section of the example strut 22. Instead of tracing the strut cross-section perimeter and rastering across the interior area of the strut as shown in FIG. 9, the inventive process simply makes a sintering pass along a sintering line 126 which passes along the geometric center line of the strut 22 between the sintering planes 118. The sintering beam in the manufacturing machine 50 may be operated at an increased focus diameter, a power level, and a speed which favor a large melt pool instead of a finer sintering resolution in order to sinter the strut 22 along a single sintering line 126. Sintering along the sintering line 126 fuses material across a width X surrounding the sintering line 126. In this manner, the length and width of the fused material approximates the cross section of the strut 22. The inventive manufacturing method saves significant time in designing and manufacturing a porous structure as compared to prior art methods of additive manufacturing because the computer 82 need only calculate and segment a path between two endpoint node coordinates and the manufacturing machine 50 traces a significantly shorter simple path to sinter each section of strut 22. Multiplied across thousands of struts 22 and hundreds to thousands of sliced sintering layers in a device 10 with a porous portion 18, the time savings in computational time and in manufacturing time sintering the device 10 are significant as manufacturing a single device 10 may involve sintering millions of strut cross-sections. In many cases, medical implants 10 with porous portions 18 as shown in FIG. 1 are sintered according to the present invention in a fraction of the time required compared to traditional sintering paths as shown in FIG. 9.

The present manufacturing methods also significantly reduce the file size for CNC code to sinter the porous structures. Sintering implants such as that shown in FIG. 1 using prior art sintering paths for the porous structure resulted in very large sizes of CNC code data files to represent the complex sintering paths. The prior art sintering paths for the porous structures often resulted in CNC files for the implants 10 which were between about 250 MB and about 500 MB. These large files often caused significant operational difficulties for the manufacturing machine 50 and in some cases exceeded the memory capacity of the manufacturing machine 50. These large CNC files created with prior art porous structure sintering paths required significant processing time by the manufacturing machine 50 to prepare the manufacturing machine 50 for sintering the implants. The manufacturing machine 50 typically required between about 8 hours and about 12 hours to process the prior art CNC files (SLI files) and prepare the manufacturing machine 50 to sinter the parts. Because of this, a machine operator was required to attend the manufacturing machine overnight while the manufacturing machine 50 processed the prior art CNC file and prepared for sintering during the next day. The manufacturing machine 50 then required significant operational time to sinter the implants because of the complexity of prior art sintering paths for the porous structure struts. Prior art sintering paths applied to a given area of a sintering layer which was filled with porous structure struts typically resulted in significantly longer sintering times than was required to sinter a similar overall area of a sintering layer filled with solid structure even though a majority of the sintering layer area filled with porous structure was empty space between strut sections and was not sintered.

In contrast, the CNC files generated by using the porous structure sintering paths of to the present invention were significantly smaller; often between about 5 MB and about 15 MB in size. These files were easily processed by the manufacturing machine 50 and were well within the memory capacity of the machine 50. The manufacturing machine 50 typically required between about 10 minutes and about 30 minutes to process a CNC file for sintering the implants with the inventive sintering paths for the porous structures. The manufacturing machine then typically required half or less operational time to sinter the implants as compared to manufacturing the porous structured implants with prior art sintering paths. Where the prior art porous structure sintering paths required significantly more sintering time for a given sintering layer area of porous structures than a similar sintering layer area of solid structure, the inventive porous structure sintering paths required much less sintering time for a given sintering layer area of porous structure than a similar sintering layer area of solid structure.

In total, sintering a batch of porous structure implants as shown in FIG. 1 with prior art sintering paths applied to porous structure would require about 18 hours of time on the manufacturing machine 50 (such as an EOS brand DMLS machine) for processing the CNC file in preparation for sintering and for sintering the parts. In contrast, sintering the same batch of porous structure implants using the inventive porous structure sintering paths would require about 3 hours of time on the same manufacturing machine 50 to process the CNC file and sinter the parts. Significant time on the manufacturing machine 50 is saved. The manufacturing cost for a given part is determined by the time the manufacturing machine 50 is occupied for the job in addition to the raw materials and the cost of the machine time is often greater than the raw materials cost. Accordingly, significant cost savings are achieved by the present methods and sintering paths for porous structure due to the reduction in manufacturing machine time. Thus, the present process for designing porous structure, generating CNC codes, and manufacturing devices with porous structure provides significant technological benefits in reducing part design time and difficulty, in reducing processing time to generate CNC code, in reducing CNC code file size, and in reducing manufacturing machine processing time and sintering time.

A general process for manufacturing a device such as a medical implant 10 which includes a porous portion 18 or which includes a solid portion 14 and a porous portion 18 includes using a computer for: creating the solid portion geometry, creating the overall geometry for the porous portion 18, creating strut and node geometry for the porous structure within the porous portion 18, slicing the solid portion geometry into layers and creating sintering paths for each layer, calculating the porous structure node point data and strut line segment data according to sintering layers and creating sintering paths for strut segments, combining the solid portion and porous structure sintering paths into a combined file of CNC code, finalizing CNC code for the manufacturing machine 50, and sintering the part. Often, creating a part using powder bed fusion additive manufacturing may involve additional steps which may vary with part geometry such as orienting a part with respect to a build plate or creating a sacrificial support structure for a part with delicate geometry. These steps are not discussed here to the detail of the steps in creating and sintering the porous structure geometry in the porous portion of a device. Unless otherwise noted, the various steps noted herein for creating, processing, transforming, etc. a file for the geometry of a desired part 10 are performed by computer hardware running computer software such as computer 82 executing software according to inputs from a user. Certain human user input is required for designing a part or for selecting certain manufacturing parameters, for example.

Figure 11:
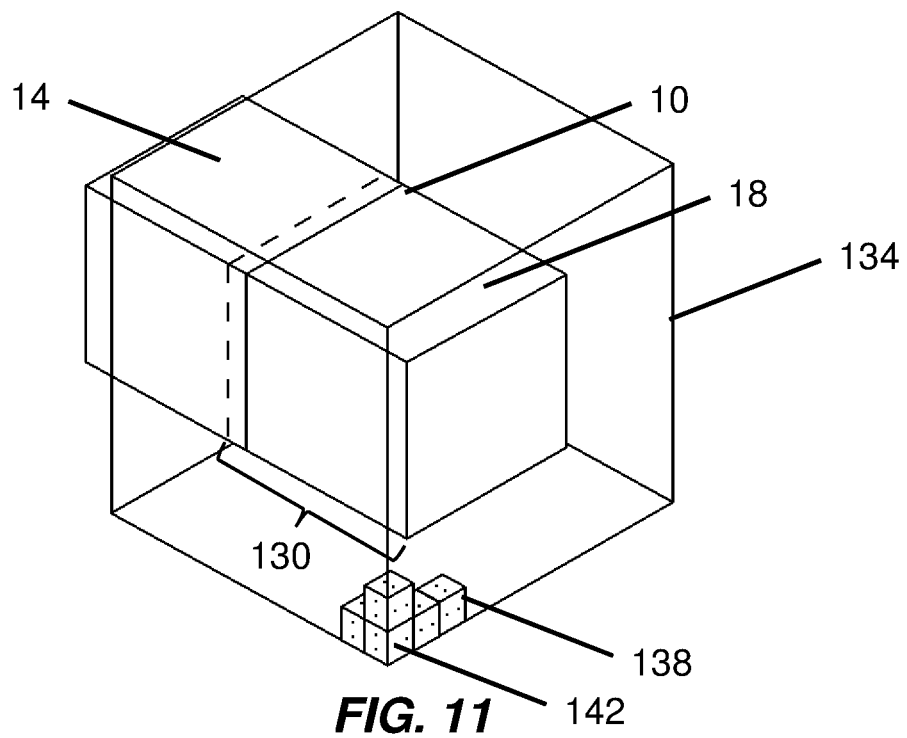
FIG. 11 is a drawing illustrating the use of bounding areas and unit cells in creating porous structure.

FIG. 11 shows a part 10 which includes a solid portion 14 and a porous portion 18. The part 10 is highly simplified to facilitate understanding of the creation of the porous structure struts and nodes and explain the manufacturing process. In reality, a desired part will more commonly be a more complex part such as the medical implant of FIG. 1. The present invention is advantageous in that a part 10 with a more complex porous portion 18 is not significantly more complex to design or manufacture. A user will typically create a computer model of the desired part 10 in a CAD program in a computer 82. Where the part 10 includes both solid portion 14 and porous portion 18, the computer model often includes a separately defined shape for the solid portion 14 and a separately defined overall shape for the porous portion 18. The computer model of the part 10 may be created so that the computer defined shape of the porous portion 18 is enlarged so that it extends into the solid portion 14 as indicated at 130. This ensures that struts 22 at the interface between the solid portion 14 and the porous portion 18 are solidly bonded to the solid portion 14 when the part 10 is manufactured. Alternatively, the strut sintering paths may be extended into the solid portion 14 while creating sintering paths. The computer model of the part 10 may be exported by the computer processor 86 as a geometric model computer file such as an STL file or an OBJ file for further processing. The solid portion(s) 14 and the porous portion(s) 18 of a part 10 may typically be handled as separate STL files as the porous portion 18 is processed separately in creating sintering paths for the struts 22 and nodes 26 of the porous portion 18.

In processing the porous portion geometry file to create struts 22 and nodes 26, the computer 82 creates a bounding area 134 which is larger than the porous portion 18 and which encloses the porous portion 18. The computer 82 then subdivides the entire volume of the bounding area 134 into unit cell volumes 138. Only a few unit cells 138 are shown in FIG. 11 in order to not obscure the part 10 but it is understood that the unit cells 138 are tiled in rows, columns, and layers which fill the volume of the bounding area 134 including the volume of the porous portion geometry and the volume of the bounding area 134 outside of the porous portion 18. Each unit cell 138 represents the volume occupied by a repeated cell structure of the porous structure geometry. The unit cell 138 is typically chosen to be the minimum size cell which contains the polyhedral cells or sections of polyhedral cells that, if repeated (tiled across 3 dimensions), will fill a space with the repeated cell structure desired for the porous structure. The unit cells 138 repeat across the bounding area 134 in continuous rows, columns, and layers to fill the bounding area 134. The bounding area 134 may often be created with a size which is a multiple of the unit cell size for convenience in populating the unit cell geometry across the bounding area 134. In this situation, the scaled size of the unit cell 138 would be determined before sizing the boundary area 134. In another example, the bounding area 134 may simply be made sufficiently large to ensure that it includes completed unit cells outside of the porous portion 18. This may make the bounding area 134 approximately 50 percent larger in each dimension than the porous portion 18, for example.

Once the bounding area 134 is created and the unit cells have been scaled appropriately, the bounding area is filled with the unit cell geometry. More particularly, the locations of seed points 142 or the locations of node points 26 which are defined geometrically within the volume of a selected unit cell 138 are populated across the bounding area 134 by tiling the unit cells across the bounding area 134 and calculating the positions of each seed point 142 (or node point 26) within the bounding area based on the translated location of each unit cell 138. The computer 82 then needs to create the geometry of the struts 22 and nodes 26 which create the porous geometry used to manufacture the porous portion 18. That is to say that computer population of unit cell data across the bounding area 134 populates the bounding area with seed points 142 or node points 26 which may then be further processed by the computer 82 to create sintering paths to manufacture the struts 22.

The geometry of the porous structure struts 22 and nodes 26 may vary depending on the complexity desired in the porous portion 18. A user may select a more complex and varied porous geometry (such as a Weaire-Phelan foam or a user designed array of seed points 142) or a more simple geometry (such as a Kelvin foam, 3D tiling polyhedron, or a crystal lattice such as a diamond lattice) and unit cell data for different unit cells which each include locations of seed points or vertex points within the unit cell for a given porous structure geometry may be stored in the computer 82. The bounding area 134 surrounding the porous portion 18 may be reoriented in order to make the surface of the porous portion 18 look less uniform. For example, the bounding area 134 (and the resulting unit cells 138) may be rotated by a few degrees about 1, 2, or 3 axes so that the resulting faces of the porous portion 18 show a more varied pattern of the struts 22 and nodes 26 forming the porous portion 18 in the finished part 10. Rotation of the bounding area 134 risks that the bounding area 134 no longer extends sufficiently beyond the porous portion 18. This may be avoided by making the bounding area 134 sufficiently larger than the porous portion 18. Alternately, the size of the bounding area 134 may be increased according to the amount of rotation (e.g. by scaling the bounding area 134 by the inverse of the cosine of the angle of rotation). Alternately, the computer may first rotate the part 10 (or the porous portion 18 of the part 10) by the desired angles, create a bounding area 134 around the rotated part, and transform the structure by the reverse rotation to properly align it with the original orientation of the part after all operations to create the porous structure seed points 142 (or even after creation of strut line segments or sintering paths if desired).

The structure of the struts 22 and nodes 26 are often defined by crystal lattice structures or polyhedral structures. For example, a simple cellular structure for the porous portion 18 may place nodes 26 on vertices of a simple cubic structure or diamond cubic structure with struts 22 along the cubic edges or on vertices of a diamond cubic structure with struts 22 connecting the nodes 26. Other polyhedral shapes such as polyhedral foams and tiling polyhedron can be used to generate nodes 26 and the interconnecting struts 22. In another example, the struts 22 and nodes 26 can be generated around seed points located at the center of cells of polyhedral foams such as the Kelvin foam structure or the Weaire-Phelan foam structure.

Figure 12:
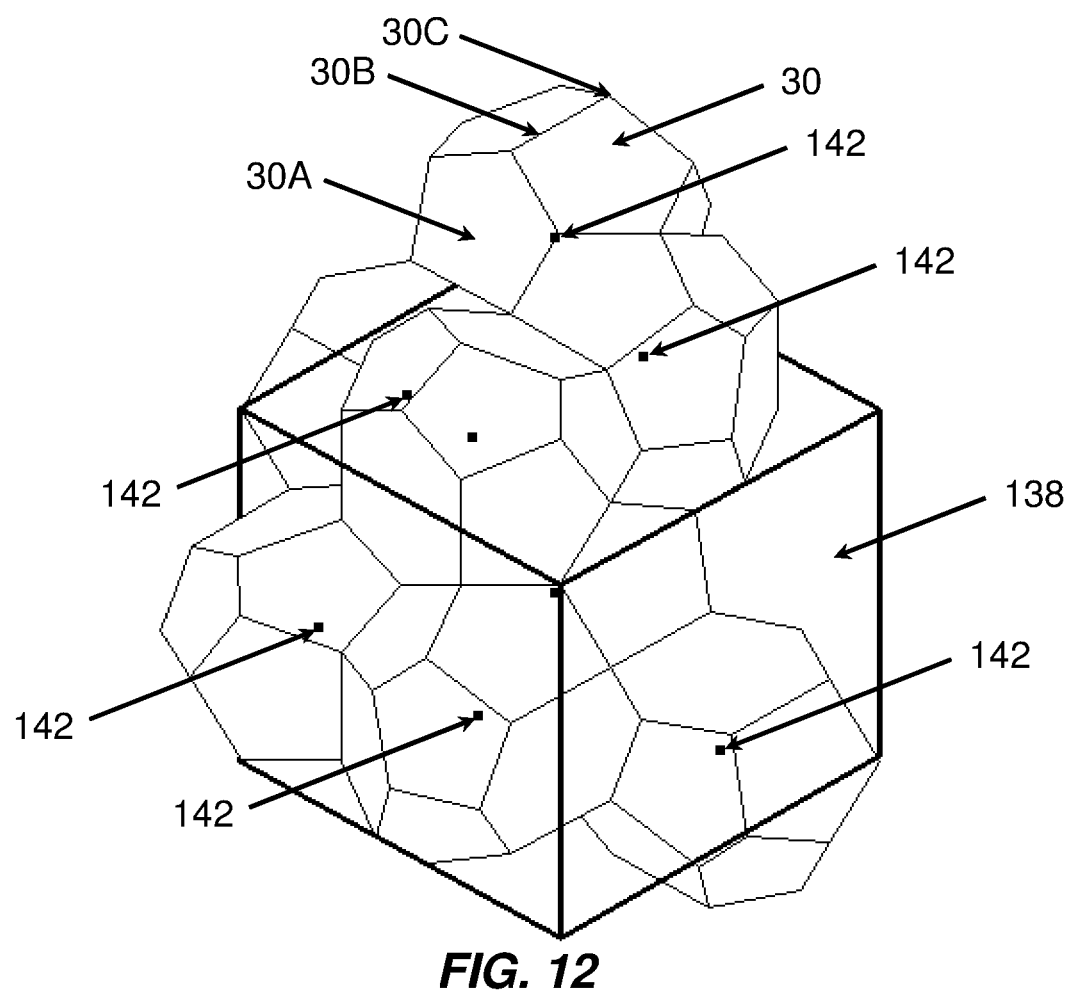
FIG. 12 is a drawing which illustrates an example porous structure geometry and seed points within a unit cell.

FIG. 12 shows a more detailed drawing of a unit cell 138. The example unit cell 138 contains the tiling group of polyhedra for a Weaire-Phelan foam structure. This foam structure includes 8 polyhedra and 8 corresponding seed points 142 located at the centers of the polyhedra. The following example discusses creation of CNC code and manufacturing such a foam structure. The unit cell 138 for a particular foam or lattice structure includes the X,Y,Z coordinates within the unit cell for the seed points 142 which are at the centers of the resulting foam cells. The locations of the seed points 142 within the unit cell 138 are identified from the locations of the centers of the cells in a foam structure and a unit cell 138 typically includes the seed points 142 for the smallest repeating group of polyhedra in the desired foam or lattice structure. The location of the seed points 142 is defined relative to the unit cell 138 for any particular porous structure so that if the unit cells 138 are scaled or rotated, the locations of the seed points 142 are scaled or rotated with the unit cell 138. The unit cell may be scaled, for example, to create a desired cell structure with a desired strut diameter and pore size.

The unit cell 138 may be rotated relative to the geometry of the porous portion 18 when rotating the bounding area 134 to increase the apparent randomness of the porous structure geometry or to align a particular axis of the porous structure with a part for strength or flow purposes, for example. Populating the unit cells 138 and their associated seed points 142 throughout the bounding area 134 populates the entire bounding area 134 with seed points 142 for the selected configuration of porous structure. FIG. 12 illustrates how the cells 30 for a polyhedral foam structure include faces 30A which separate adjacent cells, edges 30B along the perimeters of the cell faces 30A, and vertices 30C at the intersection of the edges 30B. The edges 30B of the cells become struts 22 in the porous structure and the struts 22 meet at nodes 26 at the cell vertices 30C. Openings between adjacent cells 30 in the resulting porous structure are located in the center of faces 30A.

For each stored unit cell 138, the computer 82 may store not only the locations of seed points 142, but may also store the mathematical relationship between the cell size, strut diameter, and pore size. For many porous structure geometries, the pore size PS would be related to the cell size CS and strut diameter SD by an equation such as PS=A*CS^B−C*SD. Similarly, the cell size may be related to the unit cell size UC by an equation such as UC=D*CS. With these equations stored in the computer 82, the computer 82 may receive a selection of two of the three cell variables for a type/geometry of porous structure (strut diameter, cell size, or pore size) and the computer 82 may calculate the other variable resulting from the user input. Thus, the computer 82 may receive the selection of a desired pore size and strut diameter and calculate the necessary cell size to achieve this. From the cell size, the computer may calculate the required unit cell size. The computer 82 may allow a user to simply select a unit cell type, pore size, strut diameter, and bounding area rotation angles to completely define the porous structure and generate CNC code to manufacture the porous structure.

If a different porous structure geometry was chosen than that shown in FIG. 12, a different unit cell 138 having different associated seed points 142 or node points 26 corresponding to the selected porous structure geometry would be used by the computer 82. The computer 82 may store data characterizing different unit cells corresponding to different crystalline structures, foam structures, or polyhedral tilings and may also store a mathematical relationship between the unit cell size and the size of cells within the unit cell and a mathematical relationship between the size of cells, the strut diameter, and the pore size between adjacent cells. The computer 82 may receive a selection of a stored unit cell from a user and a selection of a desired pore size and strut diameter, for example, to create the porous structure. The computer 82 may also receive from a user a unit cell geometry with node points or seed points defined by the user. Such a user created unit cell could be processed by the computer as discussed herein to create the struts and nodes resulting from the user entered unit cell.

Once the computer 82 has populated the seed points 142 within the bounding area 134, the computer may perform a Voronoi tessellation (or other desired 3D tessellation) on the space surrounding the seed points 142 to generate the corresponding vertex points for the polyhedra corresponding to the seed points. A Voronoi tessellation algorithm may be used by the computer 82 to return an output with vertices grouped according to the polyhedral cell. Vertex points often form part of multiple polyhedral cells. A Voronoi tessellation partitions the bounding area 134 into regions based on the distance to the seed points 142. The Voronoi tessellation creates cell volumes with planes separating cells such that points on the separating planes are equidistant to adjacent seed points 142 and points within a cell are closer to that cell seed point than to other cell seed points. The vertices formed at corners of the Voronoi tessellation cells are used as nodes 26 and the edges formed along intersecting planes of the faces of the Voronoi tessellation cells are used as struts 22 in the porous geometry used to manufacture the porous portion 18. A Voronoi tessellation algorithm or other tessellation algorithm may not provide connectivity information for the vertex points. That is the tessellation algorithm may not identify which vertex points connect to other vertex points along a strut. Improperly connecting a vertex point to another vertex point may result in a strut which crosses an opening between adjacent polyhedral cells or which crosses through a cell and alters a desired cell size or pore size. The computer 82 may use a convex hull algorithm on a group of vertex points corresponding to a cell to identify the polygonal faces of the cell and to properly string together the vertices into an array. In this manner, the convex hull algorithm properly identifies which vertex points are connected together by a strut along the exterior surface of the cell. The computer 82 may thus use a convex hull algorithm on the tessellation output data to create node point pairs corresponding to struts.

FIG. 3 shows a theoretical model representing the resulting struts 22 (with assigned thickness) and nodes 26 from a Voronoi tessellation of seed points 142 corresponding to a Weaire-Phelan foam. Such a 3D computer model of the struts 22 and nodes 26 is illustrative of the resulting structure, but need not be created to manufacture the structure because of the manner in which the computer 82 can calculate the CNC code for manufacturing the porous portion 18 directly from the tessellation node data.

The computer 82 produces each node 26 as a point with (X,Y,Z) coordinates which are positioned relative to the geometry of the part 10 so that the porous structure geometry is located in a proper fixed position relative to the part 10. The computer 82 produces output data from the Voronoi tessellation/and convex hull algorithm which includes the node points 26 in ordered pairs such that the pair (X1,Y1,Z1) (X2,Y2,Z2) for node point 1 (N1) and node point 2 (N2) define a line segment between node point 1 and node point 2 which represents the strut 22 which connects node point 1 to node point 2. In creating such as list of ordered pairs, the coordinates for a given node point 26 will typically be used for multiple lines corresponding to the multiple struts 22 which are joined at that node 26. For many polyhedral, foam, or crystalline structures, a given node 26 may join three or four struts 22 together. The (X,Y,Z,) coordinates for such a node would be used as an end point for three or four different struts in the tessellation output data. The computer 82 creates a data file which includes the geometry information for all of the ordered pairs of node points generated from the Voronoi tessellation. The data file may be structured to include a list of all calculated node coordinate pairs. The tessellation data may also identify which node points 26 are associated with each particular unit cell 138 or polyhedral cell 30 as this data may be used by the computer 82 to accept or reject cells 30 or unit cells 138 as part of the manufactured porous structure. This data file thus defines the line segments corresponding to each strut 22.

There are computational advantages to creation of the node points in this method. The seed points 142 for a Weaire-Phelan foam or a Kelvin foam are a fixed set of points in a unit cell 138. The geometric locations of these points 142 are easily transformed while manipulating the unit cell such as by rotating, stretching, skewing, or resizing the unit cell 138 without requiring significant computational power or time. The locations of the transformed seed points 142 are easily populated across the bounding area 134 without requiring significant computational power or time. The Voronoi tessellation can then be performed based on transformed seed points 142 without incurring any computational penalty as compared to non-transformed seed points. The resulting porous portion 18 may thus be customized by computationally simple manipulations of the unit cells 138 and seed points 142 and the same computer algorithms/programs may be used to create custom strut and node porous structure geometry based on the modified unit cells 138. Nearly any entered unit cell configuration of seed points 142 may be processed in the same manner to manufacture a resulting porous structure and the porous structure need not be created in a 3D CAD model beforehand.

If the bounding volume 134 is larger than the desired geometry of the porous portion 18, the computer will delete node points which do not form part of the desired porous portion 18. After creation of the node points 26, the computer 82 determines which parts of the porous structure struts 22 and nodes 26 should be rejected or kept for manufacturing the porous portion 18 such that the final size and shape of the manufactured porous portion will closely represent the desired size and shape. In one example, the computer 82 goes through each unit cell 138 and compares the location of each node point 26 with the geometric boundary of the porous portion 18 to determine if the node point 26 is inside or outside of the volume of the porous portion 18. Unit cells 138 completely outside of the porous portion 18 can be deleted. The computer 82 may analyze all node points 26 in a unit cell 138 and determine if the unit cell 138 contains more node points 26 which are inside of the computer model of the volume of the porous portion 18 or more node points 26 which are outside of the volume of the porous portion 18. If the unit cell 138 contains more node points inside of the volume of the porous portion 18 than outside of the volume of the porous portion 18, all node points 26 in the unit cell 138 are kept as part of porous portion 18. If the unit cell 138 contains more node points outside of the volume of the porous portion 18 than inside of the volume of the porous portion 18, all node points 26 in the unit cell 138 are deleted. This results in a more irregular surface which, once manufactured, varies more in size from the computer model geometry of the porous portion 18 as the struts 22 and nodes 26 within unit cells are built in their entirety or not at all.

In another example, the computer 82 goes through each cell 30 within the porous structure and compares the location of each node point 26 with the geometric boundary of the porous portion 18 to determine if the node point 26 is inside or outside of the volume of the porous portion 18. Polyhedral cells 30 completely outside of the porous portion 18 can be deleted. The computer 82 may analyze all node points 26 in a cell 30 and determine if the cell 30 contains more node points 26 which are inside of the computer model of the volume of the porous portion 18 or more node points 26 which are outside of the volume of the porous portion 18. If the cell 30 contains more node points 26 inside of the volume of the porous portion 18 than outside of the volume of the porous portion 18, all node points 26 in the cell 30 are kept as part of porous portion 18. If the unit cell 138 contains more node points 26 outside of the volume of the porous portion 18 than inside of the volume of the porous portion 18, all node points 26 in the unit cell 138 are deleted. This results in a somewhat irregular surface which, once manufactured, varies somewhat in size from the computer model geometry of the porous portion 18 as the struts 22 and nodes 26 within individual cells 30 are built in their entirety or not at all. Where a unit cell 138 includes several node points 142 corresponding to several cells 30 in the porous structure geometry, this method of accepting or rejecting individual cells 30 will result in a smoother surface than accepting or rejecting entire unit cells 138. Where a unit cell 138 contains only a single seed point 142/cell 30, the two methods should result in the same manufactured structure.

In another example, each individual node point 26 can be kept or rejected by the computer 82 based on whether or not the individual node point 26 is inside or outside of the computer model of the volume of the porous portion 18. This tends to build a part 10 with a porous portion 18 which is closer in dimension to the computer model of the porous portion 18 but may build more partial cells 30. In some cases, this acceptance and rejection strategy may build some struts 22 with a free outer end that does not joint to another strut 22 at a node point 26 while acceptance or rejection of cells 30 avoids manufacturing free struts 22. The relative advantage of each acceptance or rejection method may depend on the scale of the porous structure compared to the size of the part 10 and porous portion 18 as well as the final use of the part 10. Some parts 10 may benefit more from having completed cells 30 on the surface while other parts 10 may benefit more from a tighter size tolerance on the porous portion 18.

Nodes 26 adjacent the solid portion 14 may be treated differently than nodes 26 which are outside of the porous portion 18 of the part 10. It is often desirable to have theoretical struts 22 extend into the solid portion 14 by some small distance. This ensures that the struts 22 are well attached to the solid portion 14 during sintering. The computer 82 may analyze nodes 26 to identify their position relative to the volume of the solid portion 14 and keep nodes 26 which are inside of the solid portion 14 and within a predetermined distance (such as 1 mm) of the interface between the solid portion 14 and the porous portion 18 and discard nodes 26 which are farther into the solid portion 14. While sintering a layer of the part 10, the machine 50 may sinter the solid portion 14 separately from sintering the various parts of struts 22 and may sinter the area where a strut 22 enters the solid portion 14 twice due to separate CNC sintering paths for solid structures and porous structures. The predetermined distance which determines if nodes 26 which are inside of the solid portion 14 are kept may be chosen to ensure that removal of a node does not result in the next remaining node being outside of the solid portion 14; leaving the porous structure nodes 26 and struts 22 unconnected to the solid portion 14 at that location. This may be accomplished by choosing a predetermined distance from the interface between the solid portion 14 and the porous portion 18 which is larger than the typical strut length, for example.

In another example, positive attachment of the struts 22 to the solid portion 14 during manufacture may be achieved by creating an initial part geometry where the porous portion 18 extends into the solid portion 14 by a predetermined distance. Such a predetermined distance may be a distance somewhat larger than a typical strut length in the porous structure geometry such as 1.5, 2, or 2.5 times the typical strut length. Such a predetermined distance may also be somewhat larger than the size of a cell 30, such as 1.5 times the size of a typical cell 30. The computer 82 may then calculate node point pairs as discussed above and may also accept and reject unit cells 138, cells 30, or node points 26 as discussed above.

Once the computer 82 has eliminated nodes 26 which are outside of the volume of the porous portion 18 and the interface overlap between the porous portion 18 and the solid portion, the computer data for the porous structure includes a plurality of node points 26 with defined (X,Y,Z) coordinates, and the node points are paired such that each pair of node points defines end points of a line segment which is at the theoretical central axis of a strut 22. The Voronoi tessellation (or other similar tessellation algorithms) can be advantageously performed on a computer such that the tessellation program outputs the end point pairs of the cell edge lines as node point pairs defining strut line segments.

The inventive sintering method is advantageous in that the computer data defining the node point pairs which define the strut central axis line segments is sufficient to sinter the porous structure if a few parameters for operation of the manufacturing machine 50 are selected. It is not necessary to create or computationally process a 3D cad model, STL file, or other geometric model of the struts 22 and nodes 26 in order to sinter the porous portion 18 because the manufacturing machine 50 (e.g. a powder bed fusion device such as a direct metal laser sintering machine) is not conventionally operated in order to melt the perimeter of the strut cross-section at the sintering plane and then scan back and forth in the interior of the strut cross-section to fully fuse the metal particles together across the cross-section of the part in the sintering layer.

The inventive method for forming a porous structure does not rely on the 3D geometry model of the struts and nodes for sintering the part. The powder bed fusion manufacturing machine 50, such as a direct metal laser sintering machine, is re-characterized as being able to produce a range of melt pool diameters pertaining to specific desired strut diameters based on the sintering spot movement speed, laser beam power range, and the focusing range/spot size of the sintering beam on the metal powder surface of the powder bed 58. The laser beam could produce the thinnest size of strut in a single sintering pass across a sintering line 126 when finely focused and at the lowest power level which reliably fuses the metal powders together across the sintering line 126 and to a lower, previously sintered layer. The laser beam could produce the thickest size of strut in a single sintering pass across a sintering line 126 when the laser beam is at a larger spot size, at its maximum power, and moves more slowly across the metal powder. Increasing the laser power will increase the melt pool size and depth up to the limits of the manufacturing machine. Increasing the speed will decrease the melt pool size and decreasing the speed will increase the melt pool size. Accordingly, a strut of a given thickness can be formed by moving the laser fusion beam across the powder bed at a given power level, speed, and focus (if applicable) within the limits of the manufacturing machine. The laser sintering machine is operated at a selected power and speed, etc. to produce a desired melt pool size and thereby create a desired strut size while sintering along the center line of the strut. Selection of a particular melt pool size via selection of machine operation parameters achieves a resulting strut size in the manufactured device. For a desired pore size in the porous structure, the polyhedral cell size/unit cell size required to achieve this pore size may be calculated where the computer stores the relationship between unit cell size/polyhedral cell size, strut size, and pore size. For example, the computer may store that the pore size PS for a particular polyhedral foam is related to the cell size/diameter CD and strut diameter SD such that $PS=0.25*CD-SD$ and that the unit cell size UC where $CD=0.3*UC$. The computer 82 may simply store a combined form of the equations where $UC=4*(PS+SD)/0.3$. The computer 82 may then receive a selected melt pool size/strut thickness or machine operating parameters for achieving the melt pool size. The computer 82 may also receive a selection of a desired pore size. From this data, the computer may calculate that the necessary unit cell size $UC=4*(PS+SD)/0.3$. Struts which are thicker than is achievable with a single pass of the sintering beam at maximum power may be sintered by two parallel sintering paths which are offset a small distance from each other and which are otherwise calculated and executed as discussed herein. Such a configuration would still achieve the reduction in file size and usage time of the manufacturing machine 50 discussed herein.

The inventive method for manufacturing a porous structure characterizes each of the struts 22 geometrically as a line segment defined by two end points (at the respective nodes 26). As a porous structure involves a tremendous number of struts and nodes, significant computational time is saved by not creating a 3D CAD model of the porous structure, not creating an STL or similar geometry model of the porous structure, not slicing a 3D model of the porous structure, and not creating laser sintering paths for CNC code which offset and trace the perimeter of the strut cross-section in each sintering layer and sinter across the interior of the layer cross-section. Tremendous computational time is saved in avoiding the handling of a 3D model of the porous structure. As discussed above, tremendous processing and sintering time in the manufacturing machine 50 is saved.

After the computer 82 creates the computer data for the porous structure which includes a plurality of pairs of node points 26 with defined (X,Y,Z) coordinates such that each pair of node points defines end points of a line segment which is the central axis of a strut 22, this data can be analyzed by the computer 82 according to sintering layers by the computer 82 to create sintering paths CNC code for the manufacturing machine 50. Powder bed fusion involves sintering a desired part 10 layer by layer. The layers are sintered in sequence from the bottom of the part 10 to the top of the part. The thickness of sintering layers is often determined by the material being sintered, a desired layer resolution, and the power of the sintering beam. Laser sintering titanium powder may often use a layer thickness between about 0.02 mm and about 0.08 mm. Some direct metal laser sintering machines, for example, may use 30 micron (0.03 mm) and 60 micron (0.06 mm) layer thicknesses as standard layer thicknesses for sintering titanium powder. The geometry defined by the node pair data of the porous portion 18 of the device 10 is analyzed according to sintering layers by the computer with the distance between adjacent layers (the layer height) being equal to the thickness of the sintering layers used by the manufacturing machine 50 to manufacture the device 10. The layer height may be fixed or predetermined for a given manufacturing machine 50 and powder material.

Solid portion 14 in the part 10 is typically sliced by the computer 82 as shown in FIG. 9. The computer 82 analyzes the computer geometry model of the solid portion 14 of the part (e.g. the STL file representing the solid material 14) and begins at the bottom of the part 10, moves upwardly a distance equal to the sintering layer thickness, and calculates the cross section of the solid material 14 at that Z height. The computer 82 then calculates a sintering path 122 for that layer of the solid portion 14; typically by creating a perimeter section of the sintering path 122 which is offset inwardly from the edge of the cross-section of the solid portion 14 by approximately half of the width of the sintering material melt pool during manufacture (typically a predetermined value) and by creating an internal section of the sintering path 122 which moves back and forth through the interior of the solid portion cross-section with raster path segments that are offset by a predetermined distance which is less than the width of the melt pool (often about 0.5 times the width of the melt pool). Additional sintering path segments may be created to ensure proper sintering of corners, etc. Additional sections of the solid portion 14 within the sintering layer are similarly analyzed to create a sintering path. The computer 82 then creates a section of CNC code corresponding to this layer. This process is repeated to create CNC code for each sintering layer of the part 10.

The CNC code is typically a combination of machine commands and movement commands. Machine commands for a powder bed fusion manufacturing machine 50 may include a command to begin a new layer by moving the build plate downwardly by a distance equal to the layer thickness, moving a powder reservoir plunger up a corresponding distance, and sweeping a roller across the machine to move powder from a powder reservoir to the powder bed. Machine commands may also include commands to turn a sintering beam such as a laser on or off at the start and end of a sintering path or set the movement speed of the focus spot while sintering. Movement commands may include X and Y axis position information for the position of the sintering beam focus spot during a sintering path. Movement commands often direct the machine to move from the current (X,Y) position to the commanded (X,Y) position in a particular manner. For example, a movement command may command the machine to move the sintering spot to position (X,Y) in a straight line or to move to position (X,Y) in a clockwise or counter clockwise curve of radius R. Additional movement commands may cause the sintering beam focus spot position to lead into or lead out of sintering paths without sintering for inertial control of the moving machine parts. Lines in CNC code are typically executed sequentially by the manufacturing machine 50 and the CNC code is thus typically assembled in the sequence needed by the machine 50. Some aspects of CNC code may be varied in sequence. For example, sintering paths within a different sintering layer may often be executed in different orders without significantly altering the finished part. These changes, however, may affect heat management or the overall processing time due to back and forth movement between sintering paths. The particular syntax of the CNC codes often varies machine to machine. A simple example CNC code section may thus include commands to:

Move powder bed build plate by layer height Z or to position Z to begin new layer
    Roll powder onto the powder bed for new layer
    Set movement speed and laser power for laser sintering
    Move laser beam spot to (X,Y) point 1 on the powder bed corresponding to the beginning of sintering path
    Turn laser beam on
    Move laser beam spot to point 2 along the sintering path
    Move laser beam spot to point N along the sintering path
    Turn laser beam off (at the end of the path)

Many such commands are necessary to execute the many sintering layers and sintering paths to create a part 10.

The computer 82 calculates CNC code for each layer of the part based on the cross-sectional geometry of the part in that layer and assembles CNC code which provides the machine and movement commands to sinter the part 10 layer by layer in the manufacturing machine 50. In the inventive method, the computer 82 may often calculate CNC code separately for the solid portion 14 and the porous portion 18 of a part 10. This may occur because the computer 82 calculates the sintering paths from slicing and analyzing the 3D geometry file (e.g. STL file) of the solid portion 14 and may calculate the sintering paths directly from the (X,Y,Z) point data defining the locations of the nodes 26 and defining the struts 22 which extend from node point 1 to node point 2. In this situation, the computer 82 will use the same layer thickness for the solid portion 14 and the porous portion 18 and will assemble the CNC code so that the sintering paths of the solid portion 14 and porous portion 18 are grouped together or processed together by the manufacturing machine 50 according to sintering layer within the part 10. The CNC code may thus include commands to:

Initialize machine (speed, laser power)
    Initialize new layer (build plate, powder bed/reservoir, roller)
    Sinter solid portions (laser on/off, movement instructions)
    Sinter porous structures (laser on/off, movement instructions)
    Initialize new layer (build plate, powder bed/reservoir, roller)
    Sinter solid portions (laser on/off, movement instructions)
    Sinter porous structures (laser on/off, movement instructions) . . . .

Figure 13:
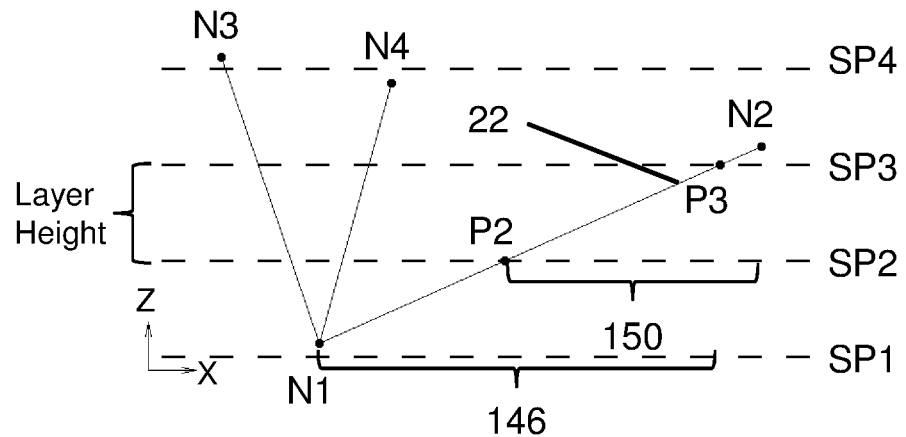
FIG. 13 is a side view drawing illustrating the analyzing of a node point pair to generate sintering paths.
Figure 14:
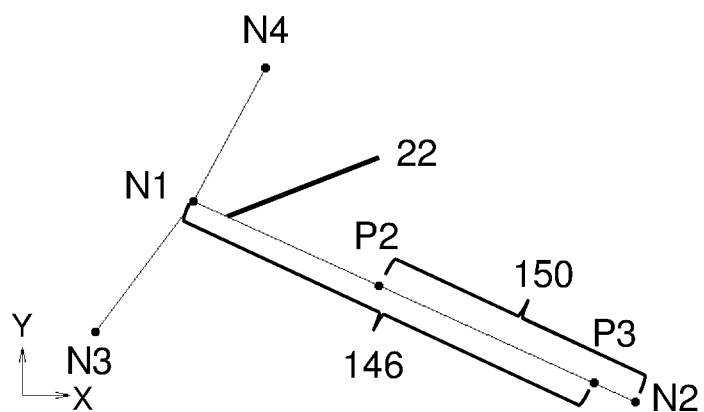
FIG. 14 is a top view drawing illustrating the analyzing of the node point pair of FIG. 12 to generate sintering paths.

The computer 82 may calculate the CNC code commands for sintering the porous portion 18 directly from the node geometry data and need not construct a 3D solid model of the porous structure struts 22 and nodes 26. Output data from computer 3D tessellation of the seed points 142 (e.g. a Voronoi tessellation) includes the node points 26 in ordered pairs such that the pair (X1,Y1,Z1) (X2,Y2,Z2) for node point 1 (N1) and node point 2 (N2) represents the strut 22 which is defined along the line segment from node point 1 to node point 2. FIG. 13 shows a side view of a strut 22 between two node points 26, indicated as N1 and N2. FIG. 14 shows a top view of this same strut 22 between nodes N1, N2. The N1 node corresponds to coordinates (X1,Y1,Z1) and the N2 node corresponds to coordinates (X2,Y2,Z2).

The computer 82 analyzes the coordinate data corresponding to the porous portion 18. The porous portion 18 will contain a large number of struts 22 and nodes 26 and the corresponding computer data will contain a large number of ordered (X,Y,Z) coordinate pairs to represent each strut. For simplicity, the computer processing methods are shown and discussed with respect to a single strut 22 (N1 to N2) and it is understood that this process is applied to each strut 22 (each node point coordinate pair) to create CNC code to sinter the porous structure. Other example struts 22 which involve node N1 (N1 to N3) and (N1 to N4) are shown. It is appreciated that struts 22 in a porous structure will typically involve a significantly larger number of sintering layers than is shown in this example. If a strut 22 is about 1 mm long and the manufacturing machine 50 is using 30 micron sintering layers, the strut 22 may pass through approximately 25 sintering layers. A smaller number of sintering layers is shown to facilitate understanding and avoid obscuring the figures.

The computer 82 analyzes the coordinate data in order to create CNC code which is used to operate the manufacturing machine 50 to sinter the struts 22 and nodes 26. Analysis and CNC code generation process is different than slicing a geometric file such as an STL file because the computer is analyzing a theoretical line segment between two node points instead of a 3D solid geometry as is the case for a solid portion 14. Example sintering planes SP1, SP2, SP3, and SP4 are indicated with dashed lines in FIG. 13. Each sintering plane is located a Z height distance above the previous sintering plane which is equal to the sintering layer thickness for the manufacturing machine 50. During manufacture, each sintering plane corresponds to the upper surface of the powder bed 58 while the machine 50 is sintering the titanium powder layered between the current sintering plane (SPn) and the previous sintering plane (SPn−1) (the sintering layer).

For each strut 22, the computer 82 will analyze line segments of the strut 22 that pass through the current sintering plane SPn to then create a sintering line associated with SPn for this segment of the strut 22. For each strut 22 and corresponding node points N1 and N2, the computer 82 determines if a portion of the strut 22 is located in the current sintering layer; that is if a portion of the strut is located between SPn and SPn−1. For the example strut 22, the strut 22 is not located in sintering layer 1 located between SP1 and SP0 (e.g. the build plate, supporting structure, etc.) and the strut is not used to create a sintering line CNC code for SP1. The strut 22 is located in sintering layer 2 located between SP2 and SP1. The strut is located in sintering layers 2, 3, and 4. In order to determine if a strut 22 is located in a given sintering plane SPn, the computer 82 can determine if a Z coordinate for N1 (ZN1) or N2 (ZN2) is less than ZSPn (the Z height of sintering plane SPn) AND if a Z coordinate ZN1 or ZN2 is greater than ZSPn−1 (the Z height of the sintering plane SPn−1). If the Z coordinates for N1 and N2 meet this criteria, the strut 22 passes through sintering plane SPn. If a strut 22 does not pass through SPn, it is ignored in creating CNC code for SPn. If a strut 22 does pass through SPn, a sintering line 126 which lies on Spn (or is associated in the CNC code with SPn) is calculated for the strut 22.

If a strut 22 passes through a sintering plane SPn, the computer calculates the point Pn where the strut passes through the sintering plane SPn. The X and Y coordinates for P2 can be calculated by linear interpolation where XP2=XN1+(XN2−XN1)*(ZSP2−ZN1)/(ZN2−ZN1). Similarly, YP2=YN1+(YN2−YN1)*(ZSP2−ZN1)/(ZN2−ZN1). X and Y coordinates for P3 can be similarly calculated.

In many cases, it is not desirable to simply sinter from N1 to P2 for SP2 and then sinter from P2 to P3 in SP3 as this may leave too little overlap and fusion between the sections of the strut 22 in SP2 and SP3 for the final structural properties desired in the porous portion 18 of the part 10. Accordingly, the sintering path may be extended linearly to ensure sufficient fusion between the sections of a strut 22 in adjacent sintering planes. The sintering path is typically not extended at the node ends of the sintering path N1 and N2 so that the strut 22 terminates at the nodes 26 and the nodes 26 are not overly enlarged. A minimum overlap distance between the sintering path in SPn and the sintering path in SPn+1 can be predetermined. This overlap between sintering paths can be achieved in different ways. In one example, the sintering path can be created by using end points where the strut line 22 passes between sintering planes SPn−1 and SPn+1. So, for SP2, the strut 22 would be sintered by a sintering path between N1 and P3 as indicated by bracket 146. For SP3, the strut 22 would be sintered by a sintering path between P2 and N2 as indicated by bracket 150. Thus, the overlap created is the difference between the lengths of bracket 146 and bracket 150. For SP4, the strut 22 would be sintered by a sintering path between P3 and N2. These sintering lines are horizontal lines in the X,Y plane of the machine 50 as the Z axis is fixed for the given sintering plane and is incremented by movement of the build plate 62. These lines are shown in top view in FIG. 14.

Figure 15:
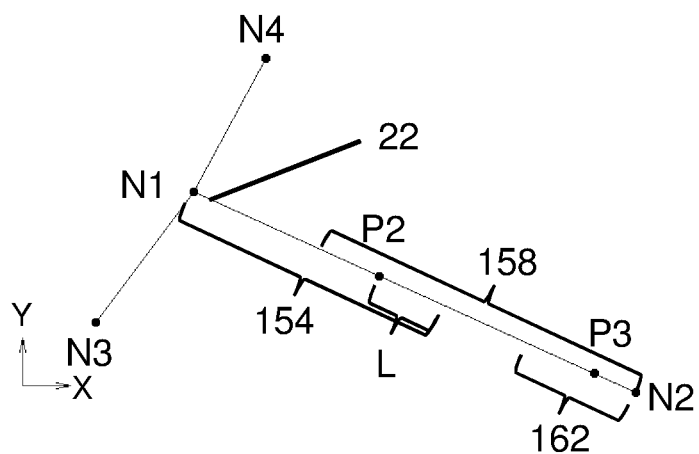
FIG. 15 is a top view drawing illustrating the analyzing of the node point pair of FIG. 12 to generate sintering paths.

In another example, the overlap between the sintering paths in adjacent sintering planes may be created by adding a predetermined length onto the beginning and end of the sintering path (except at nodes 26). This is indicated in FIG. 15 which shows a top view of the same strut 22 between N1 and N2 as shown in FIGS. 13 and 14. FIG. 15 illustrates how a distance L can be added to the ends of the sintering paths. The sintering path in SP2 can extend from N1 to P2+L, the sintering path in SP3 can extend from P2−L to P3+L, and the sintering path in SP4 can extend from P3−L to N2. The coordinates to begin and end sintering paths when distance L has been added onto the ends of the path can be computed with different computer calculation methods such as linear interpolation or liner extrapolation. In one example, the calculation may be performed by using trigonometry to determine the coordinates based on the angle of the line N1 to N2 in the X,Y plane, etc. For example, the angle A of line N1 to N2 can be calculated by the computer 82 with the arctangent function where A=A TAN((YN2−YN1)/(XN2−XN1)). The sintering line start points for the sintering line indicated at 158 can be calculated by the computer 82 where Xs=XP2−L*COS(A) and Ys=YP2−L*SIN(A). Similarly, the sintering line finish points for the sintering line indicated at 158 can be calculated by the computer where Xf=XP3+L*COS(A) and Yf=YP3+L*SIN(A). Alternate computing algorithms may be used for computational efficiency. In discussing these methods of extending a sintering path, the example discusses analysis of a portion of the line segment passing through a sintering layer thickness, such as between SPN and SPN−1. Alternate locations for the Z height sintering layer thickness used for this analysis can be used. For example, the projection of the line segment onto the sintering plane used to create a sintering path may be calculated for that portion of the line segment which passes between a sintering layer thickness centered about the sintering plane with half of the sintering layer thickness above the sintering plane and half of the sintering layer thickness below the sintering plane. Such a designation of a sintering layer thickness for SP2, for example, would extend between the Z height halfway between SP1 and SP2 and the Z height halfway between SP2 and SP3. In other words, between the sintering plane Z height minus ½ of the sintering layer Z thickness and the sintering plane Z height plus ½ of the sintering layer Z thickness.

The overlap between sintering paths in adjacent sintering planes may also be implemented by a combination of these two methods. In this case, the computer 82 may calculate sintering path start and stop points by determining where the strut line passes through adjacent sintering planes and add on a distance L. The sintering path can be created by using end points where the strut line 22 passes between sintering planes SPn−1 and SPn+1 with additional distance L added to the ends of the sintering path. So, for SP2, the strut 22 would be sintered by a sintering path between N1 and P3+L. For SP3, the strut 22 would be sintered by a sintering path between P2−L and N2. The X,Y start and stop coordinates may be calculated by the computer using the example functions given above as well as other simple functions for calculating coordinates along a line. In many applications, a distance L which is approximately equal to the sintering layer thickness, or which is between about half the sintering layer thickness and about equal to the sintering layer thickness, has proven satisfactory.

Figure 16:
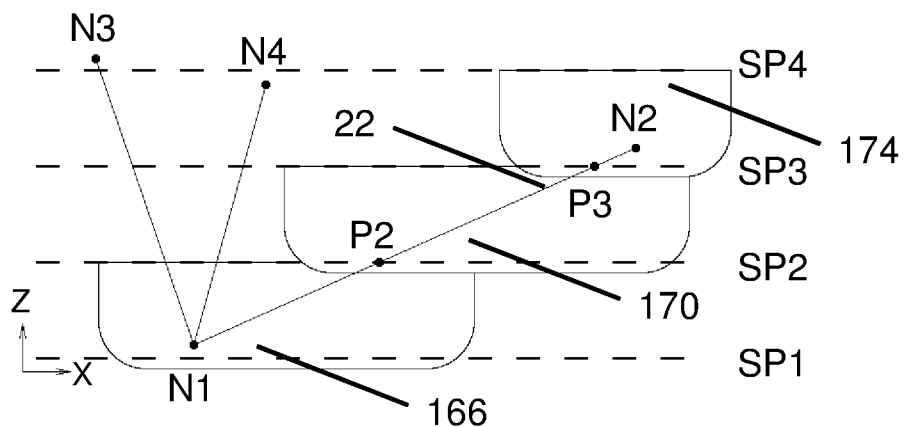
FIG. 16 is a side view drawing illustrating the sintering of the node point pair of FIG. 12 to generate a strut.

FIG. 16 shows a side view of a strut 22 between two node points 26, indicated as N1 and N2, illustrating the sintering planes and the sintered strut 22. FIG. 16 shows the result of extending the sintering path at non-node endpoints for the sintering planes. FIG. 16 shows how the strut 22 extending between nodes N1 and N2 will be formed by sintered amounts of metal powder in sintering planes SP2, SP3, and SP4 as indicated by sections of solidified metal 166, 170, 174 respectively. This figure illustrates how the strut 22 becomes somewhat stepped or irregular in shape due to the layer-wise sintering of a powder bed fusion process. It also illustrates how the different layers of solidified metal making up the strut 22 have sufficient overlap to ensure structural integrity of the strut.

As a strut center line (such as indicated as 22 in FIG. 13) becomes more vertical (more aligned with the Z axis), the X and Y distances of a sintering path determined strictly from where the strut line 22 intersects the sintering planes become smaller and smaller. In this situation, a predetermined minimum length ML of the sintering path becomes more important and forms a larger part of the length of the computer determined sintering path. The use of a minimum length of a sintering path or an added overlap value L for a given segment of a strut ensures that a melt pool is created by the laser which is sufficiently broad and deep to ensure bonding to the layer beneath and to create a strut 22 that is structurally sound.

Figure 17:
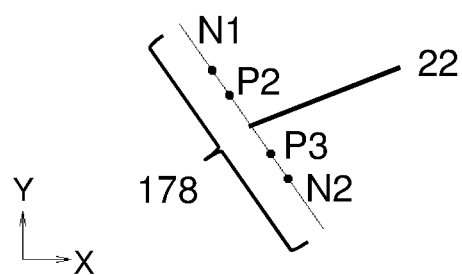
FIG. 17 is another top view drawing illustrating the analyzing of a node point pair to generate sintering paths.

FIG. 17 shows a top view of a strut 22 between two node points 26, indicated as N1 and N2 where the strut is closer to vertical with respect to the Z axis. FIG. 17 shows a situation where a strut 22 formed between nodes N1 and N2 is sufficiently vertical that the X,Y projection of the strut 22 onto the sintering planes is quite short and is less than a minimum length. The computer 82 may, in this situation, calculate a sintering path which extends beyond the node points N1 and N2 to achieve a minimum path length ML. An example sintering path is indicated at 178. The sintering path for a given sintering layer may be centered around the intersection of the line 22 with the relevant sintering plane. The sintering path for SP2 may be centered around point P2. The sintering path for SP3 may be centered around point P3. The sintering path for SP4 may be centered around N2. Each of these paths has a length equal to the minimum length ML and is oriented at the same X,Y angle defined by strut path 22.

Figure 18:
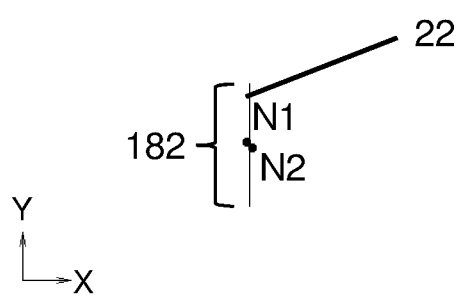
FIG. 18 is another top view drawing illustrating the analyzing of a node point pair to generate sintering paths.

FIG. 18 shows a top view of a strut 22 between two node points 26, indicated as N1 and N2 where the strut is vertical or nearly vertical with respect to the Z axis. FIG. 18 shows a situation where a strut 22 formed between nodes N1 and N2 is sufficiently vertical that the X,Y projection of the strut 22 onto the sintering planes has a length which is zero or near zero. In this case, the X,Y projection of the strut line 22 is sufficiently short that it is small compared to the expected diameter of the strut 22. A threshold projected strut length VTL onto a sintering plane such as 0.2 times the theoretical diameter of the strut 22 or a fixed length value may be predetermined as a threshold length VTL for treating a strut as vertical. If the computer 82 determines that the projected length of a strut 22 is less than VTL, the computer 82 may determine that the strut 22 is vertical or sufficiently close to be treated as vertical. The computer 82 may assign a sintering path (indicated at 182) which has a length equal to the minimum length ML or a predetermined minimum length for vertical struts VML and which has a direction which is predetermined. The direction can be chosen according to mechanics of the manufacturing machine 50. Manufacturing machines 50 may be more likely to break or bend thin vertical struts which are aligned to the X versus the Y orientation or vice versa based on how the machine spreads powder onto the powder bed 58 for subsequent layers. The direction for the sintering path 182 may be predetermined to be along the Y axis as shown, along the X axis, or at a predetermined angle if such is preferred for a particular manufacturing machine 50. The sintering path for a given sintering layer may be centered around the intersection of the line 22 with the relevant sintering plane. The sintering path for SP2 may be centered around point P2. The sintering path for SP3 may be centered around point P3. The sintering path for SP4 may be centered around N2. If the line 22 is vertical, all of these sintering paths will align vertically. Each sintering path in the porous portion 18 for struts which are vertical or near vertical has a length equal to the minimum length ML and is oriented at the same predetermined angle such as along the Y axis. This ensures adequate sintering of vertical struts 22 to lower sintering planes and ensures adequate strength of the strut 22.

The computer 82 thus processes data which includes the pairs of node points 26 that represent the strut 22 which is defined along the line from node point N1 to node point N2. The computer 82 analyzes the node point data according to sintering planes by determining which lines 22 and corresponding node points N1, N2 intersect a given sintering plane and then creates horizontal X,Y sintering paths along the projection of the strut path 22 onto each sintering plane. The computer 82 observes length rules for the creation of sintering paths to ensure that the sections of struts 22 in adjacent sintering planes are sufficiently bonded and structurally sound. The computer 82 may observe a minimum length rule ML, an overlap amount rule(s), a strut orientation from vertical rule (VTL), a vertical strut minimum length rule (ML or VML), and a vertical strut sintering path direction rule to create sintering path segments for each strut 22. The computer 82 creates CNC code from the calculated sintering paths for each strut 22 in each sintering layer.

To create a CNC code file ready for use by the manufacturing machine 50, the computer 82 will typically organize the sintering paths by sintering plane or identify each sintering path with the respective sintering plane. In one example, the computer 82 may combine the sintering path data files (e.g. the sintering path files from slicing solid structures and the sintering path files from analyzing porous node point data) by treating these as separate parts which are built during a manufacturing run. The computer 82 may create a CNC code computer file which groups all sintering paths for a given sintering plane together and which moves sequentially through sintering planes from the bottom of the part geometry to the top of the part geometry; sintering each sintering line in a particular sintering layer. The CNC code may group sintering paths for solid portions of the part together and sintering paths for porous structures within porous portions of the part together for sequential sintering by the manufacturing machine 50 during the relevant sintering layer. The computer 82 may add necessary commands to the CNC code in addition to the sintering path instructions in order to operate the manufacturing machine 50. As discussed, the CNC code typically includes combinations of commands to control aspects of the machine such as start, stop, proceed to next sintering layer, and also commands to control build operation of the machine such as sintering energy beam start and stop and X,Y movement of the beam across the powder bed to sinter the part 10. CNC code typically has different machine commands and command syntax requirements for different manufacturing machines 50. Customizing the CNC file with movement instructions (e.g. sintering paths) in order to provide the necessary machine commands and formatting may be referred to as "post processing" of CNC code to make the CNC code fit the formatting/syntax requirements of a particular manufacturing machine 50.

In traditional CNC manufacturing, a part 10 typically moves through a CAD, CAM, and post processing process to create CNC code ready for a machine. The part is designed in a 3D computer aided design (CAD) program and exported as a geometry file (such as an STL file) for processing by a computer aided manufacturing (CAM) software. The CAM software takes the geometry file and creates individual directional movement commands for a given CNC machine to execute to create the part and runs these CNC codes through a post processor/post processing routine to create a CNC file ready for use by the particular manufacturing machine 50. The inventive process allows for significantly improved powder bed fusion additive manufacturing of porous structures. The CAD design of porous struts and nodes can be eliminated and reduced to design of the overall geometric shape of the porous portion 18 of the part 10. The computer 82 can calculate node points in 3D space in pairs which define line segments corresponding to struts and directly create CNC code from the node points by analyzing the node point data set relative to sintering planes defined by a predetermined sintering layer thickness. Predetermined rules regarding sintering path minimum length, overlap, verticality, and path orientation for vertical struts ensure consistent structural integrity for the struts. This saves significant amounts of computational work in creating the porous structure geometry and creating CNC code for manufacturing the porous structure. The struts may be sintered in a powder bed fusion machine 50 with the sintering beam following a simple sintering path along the central axis of the strut instead of tracing complex perimeter and interior sintering paths. This significantly reduces the time required for a manufacturing machine 50 to process the CAD file before sintering and to then sinter the porous structure.

Figure 19:
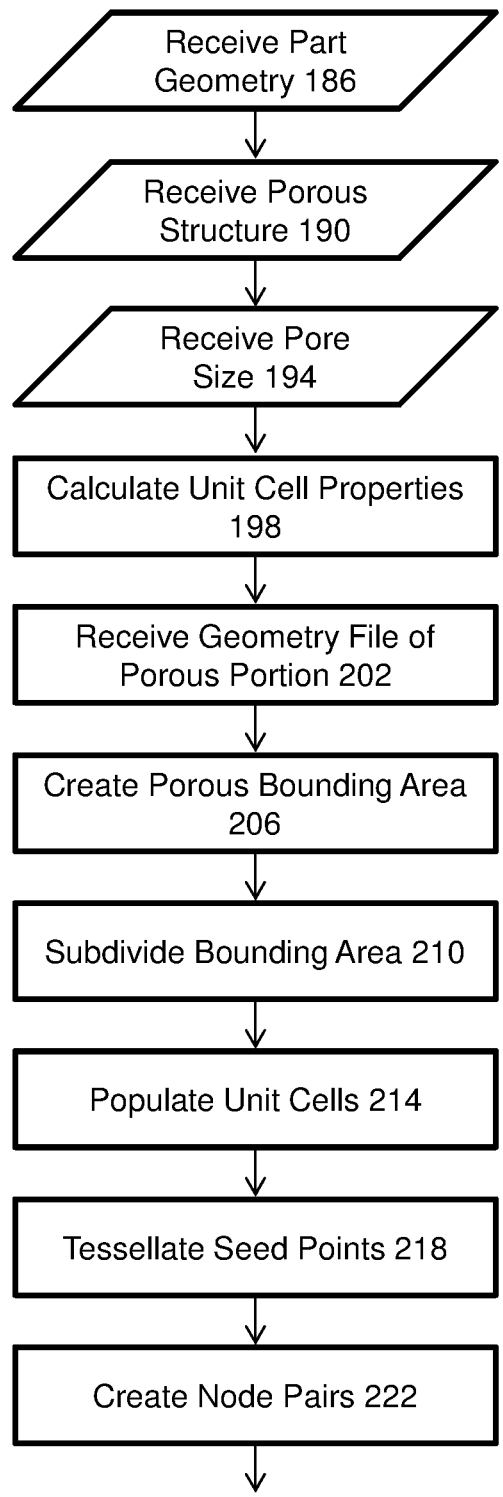
FIG. 19 is a first section of a flowchart illustrating the overall process for generating CNC code and manufacturing porous structure within a porous portion of a device.
Figure 20:
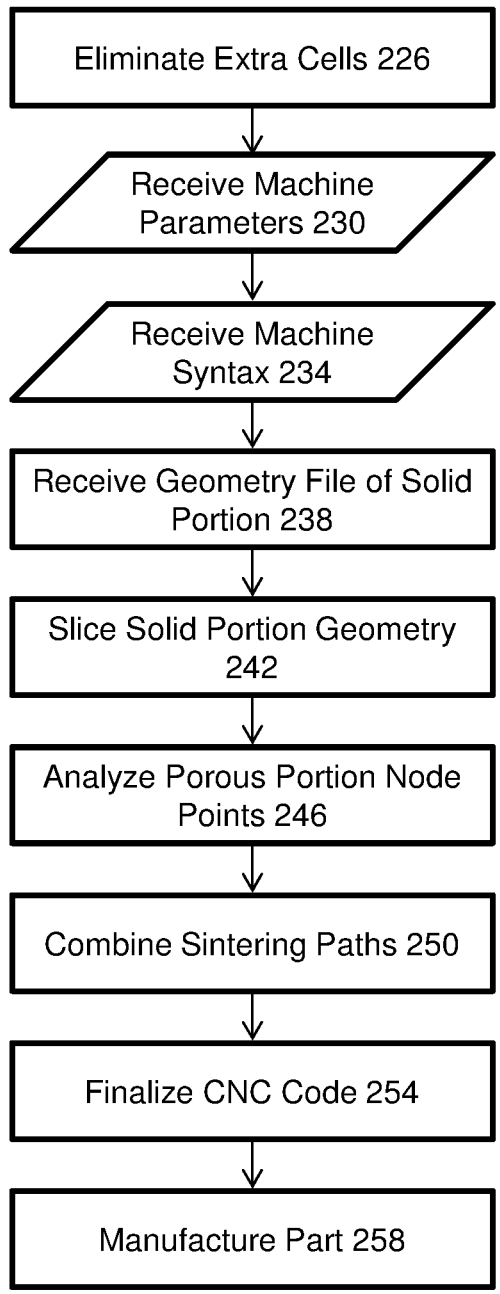
FIG. 20 is a second section of the flowchart illustrating the overall process for generating CNC code and manufacturing porous structure within a porous portion of a device.

FIGS. 19 and 20 show flowchart drawings of typical process steps performed by the computer 82 and manufacturing machine 50 in manufacturing a part with porous structure using a powder bed fusion manufacturing process. Unless otherwise noted, some of the various steps may be performed in alternate orders and/or may be combined and performed together by the computer processor. Additionally, the various steps may be distributed between the manufacturing machine 50 and a separate computer 82 according to the design and computing capability of the manufacturing machine 50. Frequently, a separate computer 82 will perform steps associated with creation of part geometry including solid portion geometry and porous portion geometry, creating porous structure geometry, and processing this geometry data to create CNC code. The CNC code is frequently then transmitted to the manufacturing machine 50 to perform final post processing/preparation of the CNC code and to manufacture the part; operating the various structures of the manufacturing machine 50 according to the CNC code commands. In some cases, some computational steps may be performed by either the computer 82 or the manufacturing machine 50, such as the final post processing of CNC code for the particular manufacturing machine 50. Some manufacturing machines 50 have onboard computer hardware which provides operational control over the machine and rely on an external computer 82 to generate CNC code through post processing. Some manufacturing machines 50 have onboard computer hardware which also provides post processing capability so that the machine receives sintering path instructions from CAM (slicing) software and performs final post processing onboard the manufacturing machine 50. Accordingly, most processing steps are discussed as being implemented by a computer 82 but may be implemented by the manufacturing machine 50. Moreover, it is understood that the processing steps are typically carried out by the computer 82 through operation of customized software which is programmed to create a CAD model of a desired part, receive part geometry information from a CAD software output file, transform part geometry into porous structure geometry and into CNC movement instructions, and finally output CNC code for execution on the manufacturing device 50 by virtue of firmware or software installed on the manufacturing machine 50. The allocation of processing steps between a separate computer 82 and computer hardware on a manufacturing machine 50 may vary.

Initially, the computer 82 may receive data regarding the part 10 and regarding desired properties of the porous structure. This data is typically received from a user. For example, the computer 82 may construct a CAD model of the part 10 in a CAD software program in response to user input such that the shape and size of the part 10 is defined as a solid model within the CAD software. The computer model of the part 10 may include sections of solid portion 14 and sections of porous portion 18. The computer modeling of the part 10 is simplified because the CAD model need not contain the individual struts 22 and nodes 26 which form the porous portion 18. Instead, the CAD model need only contain the overall shape and dimensions of the porous portion 18 within the part 10. Modeling the overall shape of the porous portion 18 instead of thousands of individual struts significantly reduces the load on the computer 82 to design and manipulate the computer model of the part 10. The computer 82 may receive 186 geometry data for the part 10 as an STL file, for example, that includes the geometry information for the size and dimensions of the part 10 such as the shape and dimensions of the solid portion 14 (if present) and the shape and dimensions of the porous portion 18. A part 10 may contain multiple separate solid portions 14 and multiple separate porous portions 18. Some of the computer calculations in creating a porous structure design and creating sintering paths may be simplified if the part 10 is handled in a positive octant of space so that all X, Y, and Z coordinates are positive. This is not, however necessary.

The computer 82 may also receive 190 predetermined or user selected attributes about the strut and node porous structure of the porous portion 18. For example, the user may select information about the shape or type of cells 30 within the porous structure, the thickness and length of the struts 22, the size of the cells 30, or the size of the pores 34 between adjacent cells 30. Some of the characteristics of possible cell/strut structure for manufacturing a porous portion 18 may be provided as preconfigured options in software on the computer 82. For example, the computer 82 may store data regarding the position of node points 26 or seed points 142 within a unit cell 138 for various different porous structures. The computer 82 may store unit cell data or point array data for desired crystal lattice structure node points or for desired foam structure seed points or node points. The computer processor may receive this data from memory and use the data for calculating an array of seed or node points and for calculating a porous structure geometry. In another example, the computer 82 may also receive unit cell/node or seed point data from a user. For example, the computer 82 may receive a selection of the location of one or more seed points or node points within a unit cell from a user and the computer may perform a Voronoi tessellation using these seed points to create a node point pairs associated with struts in a resulting node and strut structure. In creating CNC code to manufacture a part 10, the computer 82 may receive 190 porous structure geometry data such as a selection of a particular configuration of node points 26 or seed points 142 within a unit cell 138 from a user according to a structure of cells 30 or nodes 26 and struts 22 that a user desires in a manufactured porous structure.

The computer 82 may also receive 194 cell size, pore size, and/or strut diameter selections from a user. For a particular porous structure geometry (e.g. Wheaire-Phelan foam, Kelvin foam, or tiled polyhedral structure), a certain cell size and a certain strut diameter will result in a certain pore size between adjacent cells. Similarly, a certain strut diameter and a certain pore size will result in a certain cell size. The computer 82 may store or calculate the relationship between cell size, strut diameter, and pore size for a given porous structure geometry as well as the relationship between cell size and unit cell size for a given porous structure. Accordingly, the computer 82 may receive 194 certain desired inputs such as a desired pore size and a desired strut diameter from a user and the computer may calculate 198 a porous structure cell size (and corresponding unit cell size) for the porous structure geometry that achieves the desired pore size with the desired strut size.

The computer 82 may determine 198 unit cell properties (e.g. scaled unit cell size) to achieve a desired cell size (or the pore size or strut size depending on the input selections that the computer receives from a user) in order to thereby achieve a selected pore size and strut size selected by a user. The computer 82 may store cell size data corresponding to a given unit cell configuration and may thereby scale the size of the unit cell to achieve the desired cell size. For example, the computer may store that the pore size PS for a particular polyhedral foam is related to the cell size/diameter CD and strut diameter SD such that PS=0.25*CD−SD. Accordingly, if a user desires a 0.2 mm strut diameter and a 0.4 mm pore size, the computer may calculate that the necessary cell diameter CD=4*(PS+SD). Accordingly, CD=4*(0.2+0.4) and the resulting cell diameter is 2.4 mm. The computer 82 may similarly store that the cell diameter is related to the unit cell size UC where CD=0.3*UC. Accordingly, the computer 82 may calculate that the necessary unit cell size UC=CD/0.3 and the unit cell should be scaled to 8 mm to achieve the desired pore size with the selected strut diameter and porous structure geometry (e.g. type of foam or lattice structure). A desired foam or lattice structure can be characterized to relate unit cell size to cell diameter and to relate pore size to cell diameter and strut diameter. This allows a computer 82 to easily scale the unit cell 138 to an appropriate size to achieve the desired porous structure cell, strut, and/or pore size. The computer 82 may store the relationship between the pore size and the unit cell size and strut diameter directly and may calculate a resulting unit cell size according to a desired pore size and strut diameter.

The computer 82 may create 202 or receive a geometry file for the porous portion 18. The geometry file may be an STL file from a CAD model of the part 10, but may also be another CAD based geometry file such as an IGES, STEP, or OBJ file). The geometry file used by the computer in creating sintering paths may vary. STL type files triangulate the surface of a CAD model (such as an IGES or STEP file) and may be easier to process at the expense of some shape accuracy. An STL file, for example, describes the surface geometry of the part 10 without describing other attributes which may be present in a CAD model such as material, color, etc. It is common for CAM software to work with a geometry file such as an STL file to create CNC code instead of working directly with a CAD file for the part 10. Often, the CAD software is used to export an STL geometry file based on the CAD design of the part 10. For efficiency, the computer 82 may create all STL type geometry files at the same time and may create this geometry data before other computational steps regarding creation of the porous structure or CNC codes. For a part 10 with both solid portion 14 and porous portion 18, the computer 82 may create separate STL geometry files for the solid portion 14 and for the porous portion 18 as these sections of the part 10 are handled differently in creating CNC code to manufacture the part 10. The computer 82 may, however, work with native CAD files to create sintering paths instead of working with an alternate geometry file format. In working with a triangulated geometry file such as an STL file, the computer 82 may remove duplicate vertices on the surface of the part 10. This may reduce the amount of data needed to represent the surface of the part by a factor of about 6.

The computer 82 may then create 206 a bounding area around the porous portion 18 of the part 10. In creating a bounding area and an array of seed points or node points, the computer 82 may receive various selections from a user. The computer 82 may receive a selection of X, Y, and/or Z rotation angles which are used to create a relative rotation between the array of unit cells (and resulting porous structure) and the porous portion 14. This rotation may be implemented by rotating the bounding area relative to the porous portion 18, or by rotating the porous portion and then creating a non-rotated bounding area around the porous portion. The computer may also receive a user selection of a perturbation value. The computer may use a perturbation factor to randomly displace seed points or node points from their calculated positions to introduce a degree of randomness to the porous structure. The perturbation factor may be a maximum perturbation distance and may be expressed as a percentage of the size of the polyhedral cell. The computer 82 may then calculate a random perturbation for each point which is between 0 and the distance resulting from the perturbation factor. This may be beneficial in allowing creation of a more random porous structure while starting with a uniform tiling polyhedral selection such as the Kelvin foam.

The bounding area 134 may be created in multiples of the calculated (scaled) unit cell size. The bounding area 134 is sufficiently large to enclose all of the porous portion 18, typically with at least an additional unit cell dimension of space between the edges of the bounding area and the outside of the porous portion 18. If desired, the porous portion 18 or the bounding area 134 may be rotated by the rotation angles to provide a particular orientation of the porous structure within the porous portion 18. The computer 82 may then subdivide 210 the bounding area into an array of rows, columns, and layers of boxes (volumes) which are equal to the scaled size for the porous structure unit cell 138. The computer 82 may then populate 214 the bounding area 134 with an array of unit cells 138. In order to populate the bounding area 134 with unit cells 138, the computer 82 creates a grid or origin points for unit cells throughout the bounding area 134 according to the size of the scaled unit cell 138, scales the (X,Y,Z) locations of seed points 142 or node points 26 within the scaled unit cell 138 according to the calculated scaled unit cell size, and calculates the positions of these seed or node points within the bounding area 134 based on the location of the points within the scaled unit cell 138 and the translated position of each unit cell within the bounding area 134. As the array of unit cells 138 is populated across the bounding area 134, the computer 82 calculates the location of each seed point 142 (or node point 26). The computer 82 has now calculated the location of node points 26 or seed points 142 across the whole bounding area 134. As discussed, a perturbation factor may be used to introduce some randomness to the locations of seed points or node points. Rotation angles to introduce a relative rotation between the porous portion 18 and the porous structure as discussed may be implemented after generation of the array of seed or node points rather than before by rotating the geometry of the porous portion 18 or the calculated array of seed/node points. If the bounding area 134 is sufficiently large, the computer 82 may eliminate seed points or node points before tessellation or calculation of strut pairs to save computational time. Points which are farther than about 1.5 polyhedral cell sizes, for example, may be eliminated.

If the unit cells 138 are based on seed points 142, the computer may then tessellate 218 the seed points such as by performing a Voronoi tessellation in order to calculate vertex locations which are later used for node points. A Voronoi tessellation will separate the imaginary points in space around each seed point 142 such that every imaginary point is associated with the seed point which is closest to the imaginary point. This separates the space into flat faced cells (e.g. polyhedra) where faces (planes) separating adjacent polyhedra are perpendicular to a line between the associated seed points and are equally spaced between the associated seed points. The intersections of adjacent cell faces create edges and vertices around the cells. The vertices around the cells are used for node points 26 and the edges connecting vertices become struts 22 in the resulting porous structure. The computer 82 may perform the tessellation and output the vertex location data as coordinates which are associated with particular cells 30. The vertex points then need to be associated into node point pairs which identify the line segments that become struts between the points in a node point pair.

The computer 82 may then create 222 pairs of cell node points associated with struts from the groups of vertex points for each cell from the tessellation algorithm. The node points 26 are paired according to their sharing a cell edge line between the two vertex (node) points on a cell in the porous structure geometry. To create pairs of node points 26, the computer 82 may perform a convex hull calculation on each set of vertex points corresponding to each cell in the porous structure. The convex hull algorithm identifies the smallest convex polygon which contains the set of points and thereby identifies the polygonal faces in each polyhedron. A convex hull algorithm thereby identifies which points in the set of points are connected to each other along a cell edge and the computer can identify the two vertex points associated with each cell edge and create an array of (X,Y,Z) node point locations for each pair of node points associated with an edge in the polyhedron in a desired syntax or data structure. Creation of pairs of node points 26 creates the basic geometry for the porous structure as it defines the central axis line segment of the struts 22 and the nodes 26 within the porous structure. The computer 82 may then delete duplicate node point pairs since a strut 22 may be defined as part of two or more adjacent polyhedra. If the geometry of the porous portion 18 was rotated, the porous portion geometry and the calculated array of node points may be rotated back to the original configuration.

The computer 82 may then eliminate 226 unit cells 138, cells 30 or nodes 26 which are outside of the part porous portion 18 according to predetermined or user selected rules. For example, cells 30 which are completely outside of the porous portion 18 are eliminated. Cells 30 with more nodes 26 (calculated vertices) inside of the geometric volume of the porous portion 18 than outside of the porous portion 18 may be kept while cells 30 with more nodes 26 outside than inside of the porous portion 18 are deleted in their entirety. Alternatively, the rules may cause the computer 82 to delete individual nodes 26 which are outside of the porous portion 18 and keep individual nodes 26 which are inside of the porous portion 18. These rules may result in a more blocky porous portion with more intact cells on the part surface or a more smooth porous portion with more broken surface cells, respectively.

The computer 82 may receive 230 machine parameters for operation of the manufacturing machine 50. The machine parameters may include parameters necessary for creation of the CNC code such as the thickness of the sintering layer used by the machine, the size of the build plate 62, the standard melt pool width for the sintering beam, standard sintering parameters, etc. The computer 82 may also receive 234 machine syntax for the CNC code used by the manufacturing machine 50. The machine syntax may include particularities about block structure of the CNC code and command words used to operate the manufacturing machine 50. Machine syntax information may include the ordering of coordinate pairs relative to each other and to machine commands within a command line or block to cause the manufacturing machine 50 to sinter along a desired sintering path. The command words may include commands to initialize the machine 50, begin a new sintering layer (with movement of the build plate 62, powder reservoir, and roller/spreader 66), set sintering beam power level, turn the sintering beam on and off, set feed rate, set measurement and movement units, and execute movement and sintering operations to sinter the part 10. Information about the CNC codes used by the manufacturing machine 50 may be used by the computer 82 in creating CNC code or post processing CNC code to create a CNC code file which is properly formatted and is ready for use by the manufacturing machine 50.

The computer 82 may receive or create 238 a geometry model for the solid portion such as an STL file from the CAD model of the part 10. An STL file, for example, describes the surface geometry of the part 10 without describing other attributes which may be present in a CAD model such as material, color, etc. As noted, the CAD software is often used to export an STL geometry file based on the CAD design of the part 10 and such a geometry file may have been created earlier. Also, the computer 82 may work with another CAD file format such as an OBJ, IGES, or STEP file as a geometry model of the part 10 while creating sintering paths and CNC code.

The computer 82 may then slice 242 the solid portion geometry model. Where a part 10 is manufactured from the bottom up, the slices are arranged from the bottom of the part upwardly to the top of the part. Each slice layer has a height increment from the preceding slice layer height equal to the sintering layer thickness used by the manufacturing machine 50. The computer 82 may establish an array of Z coordinate values corresponding to the sintering planes. The computer 82 may then analyze the geometry file describing the solid portion 14 according to the array of sintering layer heights throughout the solid portion 14 based on the sintering layer thickness selected for the manufacturing device 50. The computer 82 may create geometry data for each of the layers within the solid portion 14 which corresponds to the cross-sectional shape of the solid portion 14 at each layer height, and create sintering path instructions which will form the desired cross-sectional shape when executed by the manufacturing machine 50. In creating the sintering path instructions, the computer will typically analyze the cross-sectional shape of the solid portion 14 at the particular layer height, create a perimeter sintering path, and create an infill path. The perimeter sintering path typically traces around the perimeter of the cross-sectional shape while being offset from the part edge according to the melt pool diameter during the sintering process. The infill sintering path is often a raster infill path which traces back and forth through the solid interior area of the part cross-section with a spacing between paths related to the melt pool size so that the infill area is completely sintered. The computer 82 completes the slicing process for as many layers as are necessary to manufacture the part 10. If a part is 30 mm tall and is manufactured with 0.03 mm sintering layers, 1000 sintering layers are necessary. The computer 82 will use the geometry file to calculate the cross-sectional shape of the solid portion 14 of the part 10 at each sintering layer and calculate sintering paths for each sintering layer. The sintering paths for the solid portion 14 will often be a series of CNC movement commands with X,Y coordinates.

The computer 82 may then analyze 246 the porous structure node pair data to create sintering paths for the porous structure in each sintering layer. As discussed, the computer 82 need not create a 3D CAD model or other geometry model of the porous structure struts 22 in order to create sintering paths for the struts 22 and nodes 26 of the porous structure geometry. The computer can analyze the data file for the pairs of node points corresponding to end points of strut central axis line segments. The computer 82 can determine which node point pairs are associated with particular sintering layers by comparing the Z coordinates in the node point pairs to the Z height of the sintering layer and including node point pairs where the strut line between the node points passes between the current layer level and the next lower layer level, or which passes through a band centered on the current sintering plane. The computer 82 can create a two dimensional sintering line in the current X,Y sintering plane for the strut by interpolating between the two node points based on the layer Z height to create coordinates where the strut central axis line segment passes through the sintering planes. The computer 82 is thereby projecting the central axis of the strut for the sintering depth associated with the current sintering plane onto the sintering plane and calculating X,Y coordinates for the sintering plane according to where the strut line segment passes through the sintering thickness. The computer 82 can apply rules to create overlap between a segment of the strut in the current sintering layer and a segment of the strut in an adjacent sintering layer. The computer 82 may, for example, extend non-endpoint (i.e. non-node) ends of a strut segment sintering line to include the length of the strut line in the next lower layer, to include a predetermined additional length, or a combination of these two. Near vertical struts which result in an X,Y sintering path with a length which is less than a predetermined minimum length value may have the X,Y sintering path extended to a minimum length. Vertical struts which are a point or nearly a point when projected onto the current sintering plane may have a sintering path created which passes through the point in a predetermined direction and is a predetermined length. Using rules for path lengths, the computer 82 may analyze all of the pairs of node points generated for the porous structure and create sintering paths from the node point pairs. The sintering paths for the porous structure will typically be a series of X,Y coordinate data or CNC movement commands with associated X,Y coordinates and associated Z sintering layer heights. The computer 82 may create CNC code for the porous structure by creating a file which combines the Z layer heights, X,Y coordinates for sintering paths, and other movement and sintering data necessary for a manufacturing machine 50 to receive the CNC code, perform any final processing of the CNC code, and sinter the porous structure. The computer may create CNC code for the porous structure in the SLI file format by creating a file with the appropriate header and CNC movement data. The header may include the number of build layers, the number of lines in the CNC code, the coordinates of a box surrounding the entire part, etc. The sintering path data for each layer may include a command signifying the start of a layer, the layer thickness, the type of line object, and the number of lines on the layer. The sintering line data for a layer may include data which is grouped so that each line in the CNC code includes the start and end X,Y coordinates for each sintering line. The end of the CNC code file may include an index table with a column of numerical layer numbers, a column of layer Z coordinates, and a column of the file position index for the start of the layer (which line in the CNC code is the start of sintering path data for that layer).

The computer 82 may then combine 250 solid portion sintering paths and porous portion sintering paths into a single file according to sintering layers. In one example, the computer 82 may treat solid the portion sintering paths as one part to be manufactured and the porous portion sintering paths as another separate part to be manufactured together during a manufacturing session. Manufacturing machines 50 may allow multiple parts to be built in a single manufacturing session in order to manufacture parts more quickly and efficiently so long as the multiple parts fit within the machine build area when distributed across the build plate 62. Accordingly, the computer 82 may treat the solid portion layer specific sintering paths as one part and the porous portion layer specific sintering paths as a separate part. The relative positioning of the porous portion sintering paths and the solid portion sintering paths is maintained so that these are properly aligned to each other to create the overall part 10. The computer may also repeat the solid portion sintering paths and the porous portion sintering paths across the build area of the manufacturing machine 50 in order to manufacture multiple parts 10 (or a combination of different parts) during the same manufacturing session. If the part 10 is repeated across the build area of the machine to manufacture multiple parts 10, the relative positioning of the solid portion sintering paths and the porous portion sintering paths is maintained to correctly build the these together into the finished part. Warnings about parts in the build area contacting each other may be ignored as it applies to solid portion sintering paths and porous portion sintering paths for a single part as these will typically overlap with each other to ensure that the solid portion and porous structure are bonded together. Commercial software allows for the duplication of parts across a machine build area to manufacture multiple parts in a single manufacturing session. The manufacturing machine 50 may then sinter the parts in this manner:

Layer1 Part1 Solid
Layer1 Part1 Porous
. . .
Layer1 PartN Solid
Layer1 PartN Porous
Layer2 Part1 Solid
Layer2 Part1 Porous
. . .
Layer2 PartN Solid
Layer2 PartN Porous
. . .
LayerN Part1 Solid
LayerN Part1 Porous
. . .
LayerN PartN Solid
LayerN PartN Porous In another example, the computer may slice the solid portion 14 and the porous portion 18 of the part 10 according to layer and may combine the solid portion and porous portion sintering paths according to layer for the part 10 before providing the CNC code to the machine, treating the solid portion and porous structure as a single part for the manufacturing session. The computer 82 may thus create the sintering paths for the solid portion 14 for the first layer, create the sintering paths for the porous portion 18 for the first layer, and create a file or data of sintering paths. The computer may then create sintering paths for the solid portion 14 for the second layer, create sintering paths for the porous portion 18 for the second layer, and add these to the file or data for sintering paths. The computer may calculate sintering paths for all layers in this manner. The computer created file or data for the sintering paths may contain a CNC code block instructing the manufacturing machine 50 to begin the first layer followed by code blocks for the sintering paths pertaining to the first layer. The file may then contain a code block instructing the manufacturing machine 50 to begin the second layer followed by code blocks for the sintering paths pertaining to the second layer, and so forth.

In another example, the computer 82 may calculate all sintering paths for the solid portion 14; creating a data file which may contain code blocks initializing or designating a layer followed by code blocks for the sintering paths pertaining to that layer. The computer 82 may then create all sintering paths for the porous portion 18; creating a data file which may contain code blocks initializing or designating a layer followed by code blocks for the sintering paths pertaining to that layer. The computer may then combine the sintering paths for the solid portion 14 with the sintering paths for the porous portion 18 layer by layer such that a resulting CNC data file includes CNC code blocks initializing or designating a layer followed by code blocks for solid portion and porous portion sintering paths, and so forth for each sintering layer in the part 10.

After creation of sintering paths by slicing the geometry model (e.g. IGES, STEP, OBJ, STL, etc. model) for the solid portion 14, analyzing the node point pair data for the porous portion 18 to create sintering paths, and combining these into a data file, the computer may finalize 254 CNC code for the manufacturing machine 50 according to post processing rules. Post processing typically refers to the computational steps to take the computer generated CNC movement instructions (sintering path instructions) and properly format this with commands, codes, and syntax or formatting for operation on a particular CNC machine. The post processing rules stored in the computer 82 may include particular machine parameters such as CNC command codes used to control operation of different parts of the machine, and may also include syntax, formatting, and code or CNC file structure for a particular machine. The computer 82 may use stored rules regarding the requirements for CNC code for a particular manufacturing machine 50 to customize the CNC movement and operational instructions for that particular machine 50. It will be appreciated that the rules and data necessary for formatting CNC codes for a particular manufacturing machine 50 may be used by the computer during the process of slicing the solid portion geometry file and the porous portion data file or during the process of compiling a file of sintering paths such that the computer applies the necessary formatting and generation steps to create CNC code for a particular machine while the sintering paths are generated or compiled into a data file.

Alternately, many CNC additive manufacturing machines receive sintering path instructions from the computer 82 after slicing the part geometry and perform final post processing internally in order to maintain control over the CNC code finally run on the machine. For such a machine, the computer 82 would slice the solid portion into sintering paths, calculate porous portion sintering paths from node point pairs, combine the solid portion sintering paths and porous portion sintering paths together (e.g. as different parts for the manufacturing session), populate the machine build area with multiple parts if desired, and send the sintering path CNC code to the manufacturing machine 50. The manufacturing machine 50 would then perform final post processing on the CNC code to implement necessary machine operational codes and prepare for sintering the parts.

After creation of CNC code for manufacturing the part 10, the part 10 is sintered 258 in a powder bed fusion manufacturing machine 50 according to the CNC code. The CNC code is executed by the manufacturing machine 50 to create the part 10. The CNC code controls the operation of the manufacturing machine 50. In particular, the manufacturing machine 50 is prepared for sintering a layer by moving the build plate and adding powder to the powder bed and the layer is sintered by selectively starting and stopping the machine energy beam (e.g. the sintering laser) while the machine 50 moves the beam focus point across the powder bed by mirrors, a gantry, a galvanometer, etc. to fuse powder layer by layer into the part 10. After the part 10 is fused, it is removed from the manufacturing machine 50 and any necessary additional processing of the part 10 is carried out to prepare the part 10 for use.

Figure 21:
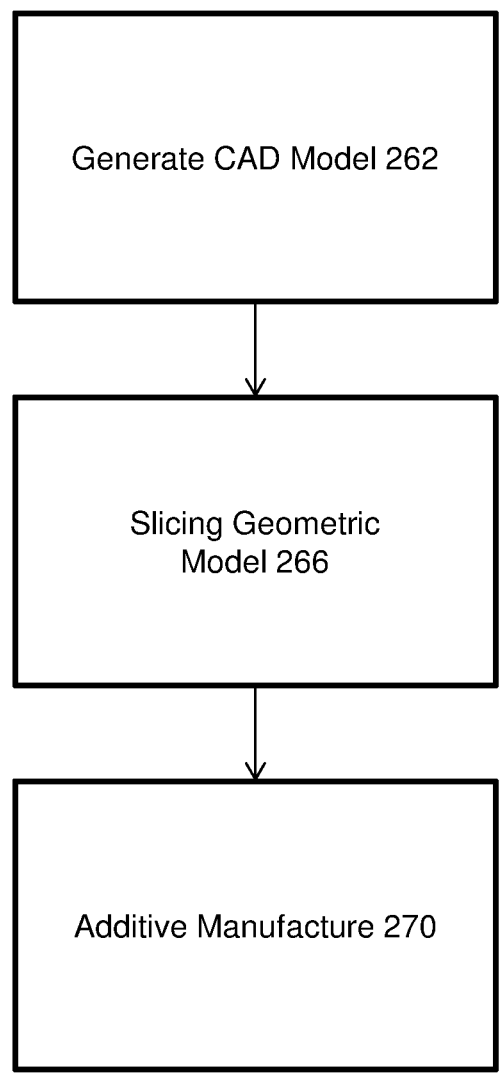
FIG. 21 is a flowchart illustrating a typical process for additive manufacturing.
Figure 22:
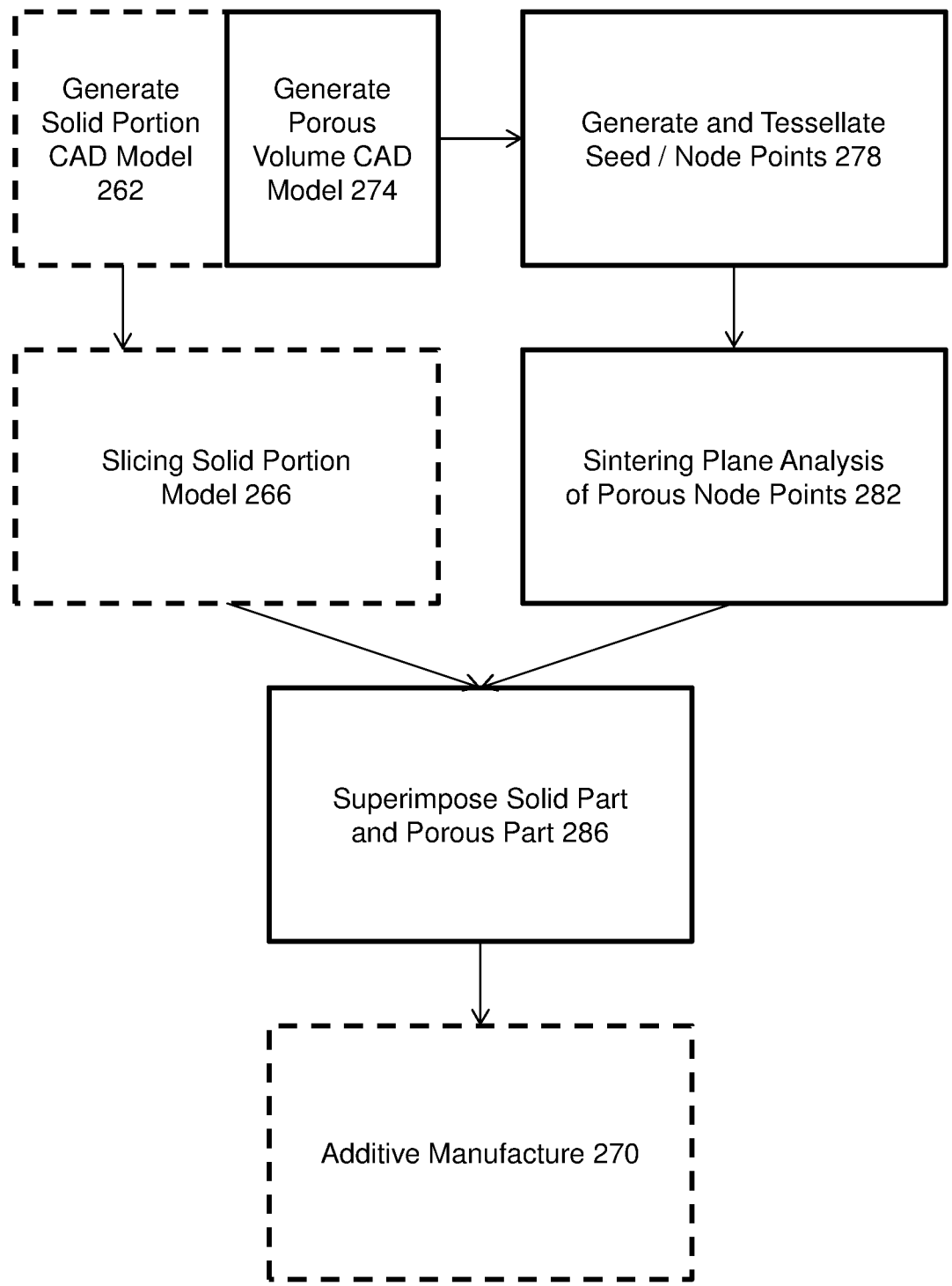
FIG. 22 is a flowchart illustrating the inventive process for additive manufacturing.

FIGS. 21 and 22 provide a conceptual comparison of a prior art sintering strategy and the inventive process for sintering a porous structure. As illustrated in FIG. 21, a prior art process involves a computer 82 generating 262 a CAD model of the porous structure which is to be created. The CAD model includes all of the struts and nodes modeled as 3-Dimensional structures. The computer 82 then slices 266 the CAD model (or an outputted geometry model of alternate file type) to create cross-sections of each strut at each sintering layer and prepare CNC code for sintering each cross-sectional area in each slice. The output from slicing the geometric model of the porous structure is then sent to a manufacturing machine which finalizes the CNC code and manufactures 270 the part.

FIG. 22 illustrates the inventive process at a comparative level. The computer 82 generates 262 a CAD model of solid structure if such is present in the desired part. Rather than generating a CAD model of porous structure struts and nodes, the computer 82 generates 278 a CAD model of the overall volume (shape, dimensions, etc.) of the porous portion of the part. The computer 82 then populates seed/node points across the space occupied by the porous structure, tessellates space around the seed points, and generates node point pairs corresponding to struts in a porous structure. The computer 82 then analyzes 282 pairs of node points according to sintering layers to determine where strut center axis line segments between node points pass through sintering planes and to create sintering paths along the projection of the strut center axis line segments onto the sintering plane observing overlap and length rules. The computer 82 creates CNC code for the struts in each sintering plane from the calculated sintering paths. The computer 82 then superimposes the sintering path CNC code for the porous portion with the sintering path CNC code for the solid portion (if present in the part) so that the solid portion and porous portion are sintered together. The computer transmits the CNC code to the manufacturing machine which finalizes the CNC code and manufactures 270 the part.

The above description of illustrated examples of the present invention, including what is described in the Abstract, are not intended to be exhaustive or to be limited to the precise forms disclosed. While specific examples of the invention are described herein for illustrative purposes, various equivalent modifications are possible without departing from the broader scope of the present claims. Indeed, it is appreciated that specific example dimensions, materials, equations, porous structures, polyhedral shapes, angles, data file formats, times, etc., are provided for explanation purposes and that other values may also be employed in other examples in accordance with the teachings of the present invention.

What is claimed is:

1. A method for manufacturing a device having a porous structure through powder bed fusion additive manufacturing comprising:
    a computer comprising a processor and memory operatively connected to the computer processor receiving first geometry data describing overall shape and size of a porous portion which forms at least part of the device;
    the computer, creating in a file, a representation of an open celled porous structure for manufacture as the porous portion of the device, wherein the porous structure comprises a plurality of struts joined together at nodes and void space between struts, the computer creating the open celled porous structure by:
    the computer creating a geometric boundary area which encloses the porous portion of the part in 3D space;
    the computer populating node points across the geometric boundary area, wherein node point pairs define line segments extending between node points along central axes of struts in a porous structure;
    the computer receiving an array of Z coordinate values for sintering planes according to a sintering layer thickness;
    the computer analyzing node point pairs according to 3D coordinates of the node points and according to sintering plane Z coordinate values to, for each sintering plane:
        identify line segments which pass through the sintering plane,
        for a sintering layer thickness associated with the sintering plane, create a projection on the sintering plane of a portion of a line segment which passes through the sintering layer thickness, and
        creating, in the file, a sintering path from the projected line segment for each portion of a line segment passing through the sintering plane;
    wherein the file is suitable for execution on an additive manufacturing machine to thereby sinter the part in a powder bed fusion additive manufacturing process.

2. The method of claim 1, wherein the method further comprises:
    the computer receiving a selection of porous structure data comprising a geometric unit cell having seed point locations for a corresponding polyhedral cell structure, wherein the seed point locations are geometrically defined within the unit cell;
    the computer populating seed points across the geometric boundary area;
    the computer tessellating space around the seed points to thereby generate vertex points for corresponding polyhedral cells wherein the seed points are located at centers of the polyhedral cells; and
    the computer creating ordered pairs of node points associated with polyhedral cells such that each ordered pair of node points represents a line segment falling along an edge of a polyhedral cell between two vertex points.

3. The method of claim 2, wherein the method further comprises:
    the computer receiving a selection of porous structure property data comprising a pore size and a strut diameter; and
    the computer calculating a scaled unit cell size from a desired pore size and strut diameter.

4. The method of claim 2, wherein the method further comprises:
    the computer receiving a selection of porous structure property data comprising a pore size and a strut diameter;
    the computer calculating a polyhedral cell size for a porous structure from the pore size and strut diameter; and
    the computer calculating a scaled unit cell size from the calculated polyhedral cell size.

5. The method of claim 4, wherein the method further comprises:
    the computer subdividing the geometric boundary area into sections corresponding to the scaled unit cell size; and
    the computer populating the scaled unit cell throughout the geometric boundary area to thereby populate seed point locations across the geometric boundary area.

6. The method of claim 2, wherein the geometric boundary area is larger than the porous portion of the device, and wherein the method further comprises:
    the computer eliminating node points associated with polyhedral cells which are located outside of the porous portion of the device.

7. The method of claim 1, wherein the method further comprises:

the computer creating a relative rotation in 3D space about at least one axis by a predetermined angle between the porous portion shape and the node points to thereby create a relative rotation between a network of struts in a manufactured porous structure and the device porous portion shape.

8. The method of claim 1, wherein the method further comprises:
the computer processor receiving second geometry data describing overall shape and size of a solid portion which forms at least part of the device;
the computer slicing the solid portion geometry data to create cross-sections of the solid portion at Z coordinate values for the sintering planes;
the computer creating, in the file, for each sintering plane cross-section of the solid portion, a sintering path configured to cause an additive manufacturing machine to sinter a layer of a powdered material into a corresponding solid portion of the part;
wherein the file includes solid portion sintering paths and porous portion sintering paths and is configured to cause the manufacturing machine to manufacture the solid portion and the porous portion as a unitary device.

9. The method of claim 1 wherein the file is a CNC file and wherein the method more specifically comprises:
the computer outputting the CNC file for execution on an additive manufacturing machine to thereby sinter the part in a powder bed fusion additive manufacturing process wherein the additive manufacturing machine sinters sections of porous portion struts in a sintering layer by sintering along the projection of a central axis of the strut onto the sintering layer without sintering along a cross-sectional perimeter of the strut.

10. The method of claim 1, wherein the method more specifically comprises the computer creating, in the file, a sintering path which comprises a linear path along a projection of a center line of a strut onto a sintering plane without sintering to infill a cross-section of the strut at the sintering plane.

11. The method of claim 1, wherein the line segment corresponds to a central axis of a strut, and wherein a length of the sintering path corresponds to a projection onto the sintering plane of a portion of the center line of the strut passing through the sintering layer thickness.

12. The method of claim 11, wherein the method comprises the computer creating, in the file, a sintering path which is extended in length at non node point ends of the line segment by a predetermined amount to thereby cause overlap between sintering paths in adjacent sintering layers.

13. The method of claim 1, wherein the method comprises:
the computer, for a line segment between a pair of node points with a projected length onto the sintering plane of a portion of the line segment passing through a sintering layer thickness wherein the projected length is less than a minimum predetermined length, creating, in the file, a sintering path along a projection of a portion of the line segment onto the sintering plane and with a length which is equal to a predetermined minimum length.

14. The method of claim 13, wherein the method comprises:
the computer creating, in the file, the sintering path along a predetermined direction.

15. A method for manufacturing a device having a porous structure through powder bed fusion additive manufacturing comprising:
a computer comprising a processor and memory operatively connected to the processor receiving geometry data describing overall shape and size of a porous portion forming at least part of a device;
the computer creating a CNC code file to facilitate manufacture of a porous structure as the porous portion of the device, the porous structure comprising a plurality of struts joined together at nodes with void space between struts by:
the computer receiving an array of Z coordinate values corresponding to sintering planes according to a sintering layer thickness;
for each strut within the porous structure:
the computer identifying a line segment corresponding to a central axis line for the strut;
the computer creating, in the CNC code file, a sintering path along a projection of the line segment onto a sintering plane, wherein the sintering path does not trace a perimeter of a strut cross-section at the sintering plane and wherein the sintering path does not infill the strut cross-section at the sintering plane; and
the computer outputting the CNC code file for execution on a powder bed fusion additive manufacturing machine to cause the machine to manufacture the device whereby the machine manufactures a segment of a strut by sintering along a projection of a central axis of the strut.

16. The method of claim 15, wherein the method further comprises:
the computer analyzing node point pairs according to 3D coordinates of the node points and according to sintering plane Z coordinate values to, for each sintering plane:
identify line segments which pass through the sintering plane,
for a sintering layer thickness associated with the sintering plane, create a projection on the sintering plane of a portion of the line segment which passes through the sintering layer thickness, and
create, in the CNC code file, a sintering path from the projected line segment for each portion of a line segment passing through the sintering plane.

17. The method of claim 15, wherein the method further comprises:
the computer populating node points across the porous geometry, wherein pairs of node points define a line segment corresponding to a strut central axis.

18. The method of claim 15, wherein the method further comprises:
the computer populating seed point locations across the porous geometry;
the computer tessellating space around the seed points to thereby generate vertex points for polyhedral cells wherein the seed points are located at centers of the polyhedral cells; and
the computer creating ordered pairs of node points associated with polyhedral cells such that each ordered pair of node points represents a line segment falling along an edge of a polyhedral cell between two vertex points and represents the central axis of a strut between the node points.

19. The method of claim 18, wherein the method further comprises:
the computer receiving a selection of porous structure data comprising a geometric unit cell having seed point locations for a polyhedral cell structure geometrically defined within the unit cell;

the computer calculating a scaled unit cell size from a desired pore size; and the computer distributing scaled unit cell data across the porous geometry to thereby populate seed point locations across the porous geometry.

20. The method of claim 19, wherein the method further comprises:

the computer creating a geometric boundary area which encloses the porous geometry;

the computer subdividing the geometric boundary area into sections corresponding to the scaled unit cell size; and the computer populating the scaled unit cell throughout the geometric boundary area to thereby populate seed point locations across the porous geometry.

21. The method of claim 15, wherein the method more specifically comprises the computer creating, in the CNC code file, a sintering path along a projection of the line segment onto a sintering plane and with a length corresponding to a projection of a portion of the line segment which passes through a sintering layer thickness associated with the sintering plane onto the sintering plane.

22. The method of claim 21, wherein the method further comprises the computer extending a length of the sintering path at non node point ends of the projected line segment by a predetermined amount to create overlap between sintering paths in adjacent sintering planes.

23. A method for manufacturing a device having a porous structure through powder bed fusion additive manufacturing comprising:

a computer comprising a processor and memory operatively connected to the computer processor receiving geometry data describing overall shape and size of a porous portion forming at least part of a device;

the computer creating a CNC code file to facilitate manufacture of a porous structure as the porous portion of the device such that the porous structure comprises a plurality of struts joined together at nodes with void space between struts by:

using node points to define a line segment which represents a strut in the porous structure;

creating, in the CNC code file, a sintering path by creating a projection of the line segment onto a sintering plane; and outputting the CNC code file for execution on a powder bed fusion additive manufacturing machine to cause the machine to manufacture the porous structure struts by sintering powder in a sintering layer along the projection of the line segment onto the sintering plane without sintering along a perimeter of a cross-section of the strut at the sintering plane and without sintering to infill a cross-section of the strut at the sintering plane.

24. The method of claim 23, wherein the method comprises:

the computer creating, in the CNC code file, instructions configured to operate the additive manufacturing machine such that a strut diameter corresponds to a machine melt pool size.

25. The method of claim 23, wherein the method further comprises:

the computer receiving a selection of a manufacturing machine sintering beam power and focus point movement speed, the computer creating, in the CNC code file, instructions configured to operate the manufacturing machine at the sintering beam power and focus point movement speed to thereby create a determined melt pool size and thereby create a strut diameter which is approximately equal to the melt pool size.

26. The method of claim 23, wherein the method further comprises:

the computer calculating an array of polyhedral cells, wherein the node points are defined by vertex points on the polyhedral cells, and wherein the line segment lies along an edge of a polyhedral cell.

27. The method of claim 26, wherein the method further comprises:

the computer receiving a selection of a strut diameter and a pore size for the porous structure;

the computer calculating a polyhedral cell size according to the strut diameter and the pore size.

28. The method of claim 23, wherein the method further comprises:

the computer populating seed point locations across the porous portion;

the computer tessellating space around the seed points to thereby generate vertex points for polyhedral cells wherein the seed points are located at centers of the polyhedral cells; and the computer creating ordered pairs of node points associated with polyhedral cells such that each ordered pair of node points represents a line segment falling along an edge of a polyhedral cell between two vertex points and represents the central axis of a strut between the node points.

29. The method of claim 23, wherein the method further comprises:

the computer analyzing node point pairs according to 3D coordinates of the node points and according to sintering plane Z coordinate values to, for each sintering plane:

identify line segments which pass through the sintering plane, for a sintering layer thickness associated with the sintering plane, create a projection on the sintering plane of a portion of the line segment which passes through the sintering layer thickness, and and wherein the step of creating, in the CNC code file, a sintering path by creating a projection of the line segment onto a sintering plane comprises creating, in the CNC code file, a sintering path from the projected line segment for each portion of a line segment passing through the sintering plane.

30. The method of claim 29, wherein the method further comprises the computer creating, in the CNC code file, a sintering path with a length which is extended at non node point ends of the projected line segment by a predetermined amount to create overlap between sintering paths in adjacent sintering planes.

* * * * *